US011160092B2

(12) United States Patent
Chen et al.

(10) Patent No.: US 11,160,092 B2
(45) Date of Patent: Oct. 26, 2021

(54) SERVICE DATA TRANSMISSION METHOD, USER EQUIPMENT AND NETWORK SIDE DEVICE

(71) Applicant: CHINA ACADEMY OF TELECOMMUNICATIONS TECHNOLOGY, Beijing (CN)

(72) Inventors: Li Chen, Beijing (CN); Wei Bao, Beijing (CN); Fangli Xu, Beijing (CN); Xueming Pan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 365 days.

(21) Appl. No.: 16/090,579

(22) PCT Filed: May 4, 2017

(86) PCT No.: PCT/CN2017/082977
§ 371 (c)(1),
(2) Date: Oct. 1, 2018

(87) PCT Pub. No.: WO2017/193861
PCT Pub. Date: Nov. 16, 2017

(65) Prior Publication Data
US 2019/0116606 A1    Apr. 18, 2019

(30) Foreign Application Priority Data
May 13, 2016 (CN) .......................... 201610320112.4

(51) Int. Cl.
*H04W 72/08* (2009.01)
*H04W 72/12* (2009.01)
*H04L 7/10* (2006.01)

(52) U.S. Cl.
CPC ............. *H04W 72/087* (2013.01); *H04L 7/10* (2013.01); *H04W 72/1236* (2013.01); *H04W 72/1268* (2013.01)

(58) Field of Classification Search
CPC ........... H04W 72/087; H04W 72/1236; H04W 72/1268; H04L 7/10
See application file for complete search history.

(56) References Cited

U.S. PATENT DOCUMENTS 10,555,301 B2 *  2/2020  Li ........................ H04W 72/042
10,609,725 B2 *  3/2020  Zhang ................... H04W 72/14
(Continued)

FOREIGN PATENT DOCUMENTS

CN       101330313 A      12/2008
CN       102104974 A       6/2011
(Continued)

OTHER PUBLICATIONS

Written Opinion of the International Searching Authority from PCT/CN2017/082977, dated Jun. 23, 2017, with English translation from WIPO.
(Continued)

*Primary Examiner* — Kibrom T Hailu
(74) *Attorney, Agent, or Firm* — Ladas & Parry, LLP

(57) ABSTRACT

A service data transmission method, a UE and a network side device are provided. The service data transmission method includes: upon receipt of a scheduling command for an uplink resource from a network side device, acquiring attribute information of to-be-transmitted service data packets, the attribute information of the to-be-transmitted service data packets including a time delay; and mapping the to-be-transmitted service data packets to the uplink resource in accordance with a time delay requirement on the to-be-
(Continued)

transmitted service data packets, and transmitting the to-be-transmitted service data packets on the uplink resource.

16 Claims, 10 Drawing Sheets

(56) References Cited

U.S. PATENT DOCUMENTS

| | | | |
|---|---|---|---|
| 10,727,983 B2* | 7/2020 | Damnjanovic | H04L 5/0092 |
| 2005/0208948 A1 | 9/2005 | Yosuke et al. | |
| 2007/0297386 A1 | 12/2007 | Zhang et al. | |
| 2010/0240385 A1 | 9/2010 | Löhr et al. | |
| 2010/0285743 A1* | 11/2010 | Li | H04B 7/2606 455/15 |
| 2012/0177014 A1* | 7/2012 | Wang | H04L 27/2601 370/337 |
| 2014/0177573 A1* | 6/2014 | Han | H04W 72/1242 370/329 |
| 2014/0348123 A1* | 11/2014 | Zhou | H04W 72/1278 370/330 |
| 2016/0095137 A1 | 3/2016 | Chen et al. | |
| 2016/0227556 A1* | 8/2016 | Han | H04W 72/12 |
| 2016/0227575 A1* | 8/2016 | Furuskog | H04W 72/14 |
| 2017/0290026 A1* | 10/2017 | Li | H04W 72/12 |
| 2018/0020467 A1* | 1/2018 | Nouah | H04L 5/0064 |
| 2018/0070368 A1* | 3/2018 | Quan | H04L 1/1822 |
| 2018/0324839 A1* | 11/2018 | Feng | H04W 72/042 |
| 2018/0338307 A1* | 11/2018 | Feng | H04L 1/00 |

FOREIGN PATENT DOCUMENTS

| | | |
|---|---|---|
| CN | 102932924 A | 2/2013 |
| CN | 104619034 A | 5/2015 |
| CN | 105188150 A | 12/2015 |
| CN | 105554892 A | 5/2016 |
| EP | 1578069 A1 | 9/2005 |
| JP | 2010506470 A | 2/2010 |
| JP | 2017535131 A | 11/2017 |
| WO | 2016040290 A1 | 3/2016 |
| WO | 2016048593 A1 | 3/2016 |

OTHER PUBLICATIONS

International Preliminary Report on Patentability, from PCT/CN2017/082977, dated Nov. 13, 2018, with English translation from WIPO.
First Office Action and Search Report from CN app. No. 201610320112.4, dated Dec. 14, 2018, with machine English translation from Google Translate.
Extended European Search Report from EP app. No. 17795479.9, dated Mar. 25, 2019.
International Search Report for PCT/CN2017/082977 dated Jun. 23, 2017 and its English translation provided by WIPO.
Written Opinion of the International Search Authority PCT/CN2017/082977 dated Jun. 23, 2017 and its English translation provided by Google Translate.
Notice of Reasons for Refusal from JP app. No. 2018-559776, dated May 12, 2020, with English translation provided by Global Dossier.
Notification of Reason for Refusal from KR app .No. 10-2018-7036217, dated Apr. 9, 2020, with English translation from Global Dossier.
"Views on TTI length", R1-162108, 3GPP TSG RAN WG1 Meeting #84bis, Busan, Korea, Apr. 11-15, 2016.
Notice of Reasons for Refusal from JP app. No. 2018-559776, dated Oct. 23, 2019, with English translation from Global Dossier.

* cited by examiner

SERVICE DATA TRANSMISSION METHOD, USER EQUIPMENT AND NETWORK SIDE DEVICE

CROSS-REFERENCE TO RELATED APPLICATIONS

The present application is the U.S. national phase of PCT Application PCT/CN2017/082977 filed on May 4, 2017 which claims a benefit of and priority to the Chinese patent application No.201610320112.4 filed on May 13, 2016, the disclosures of which are incorporated herein by reference in their entireties.

TECHNICAL FIELD

The present disclosure relates to the field of communication technology, in particular to a service data transmission method, a User Equipment (UE), and a network side device.

BACKGROUND

For a Long Term Evolution (LTE) system, a basic time unit for scheduling and allocating resources and transmitting data between air interfaces is Transmission Time Interval (TTI), and before Release 13 (Rel-13), the TTI has a length of 1 ms (referred to as 1 ms TTI hereinafter).

In Rel-14, in order to support time-delay-sensitive services in a better manner, a shorter TTI having a length smaller than 1 ms (referred to as short TTI hereinafter) has been introduced into the LTE system.

Currently, uplink channels capable of supporting the transmission within the short TTI at least include a short Physical Uplink Control Channel (s-PUCCH) and a short Physical Uplink Shared Channel (s-PUSCH), and downlink channels capable of supporting the transmission within the short TTI at least include a short Physical Downlink Control Channel (s-PDCCH) and a short Physical Downlink Shared Channel (s-PDSCH).

In the LTE system, Radio Bearer (RB) is a basic unit for Quality of Service (QoS) management. Data packets having different QoS requirements are mapped to different RBs and then transmitted. For example, data packets of voice services are mapped to the RBs where the time delay is strictly restricted and where parts of the packets are allowed to be lost. For another example, data packets of File Transfer Protocol (FTP) services are mapped to the RBs where the time delay is not highly restricted and where a Block Error Rate (BER) is very low.

FIG. 1 shows an air-interface protocol stack for a UE. For a scheduling procedure at the UE, each RB corresponds to a pair of Packet Data Convergence Protocol (PDCP)/Radio Link Control (RLC) entities, and different RBs are converged at a Media Access Control (MAC) layer and transmitted through a physical layer (PHY).

Upon the receipt of uplink scheduling signaling from an evolved Node B (eNB) by an MAC entity of the UE, when the uplink scheduling signaling relates to Hybrid Automatic Repeat reQuest (HARQ) initial transmission, the MAC entity schedules the transmission in accordance with such factors as a size of a resource allocated by the eNB, a QoS requirement on a data packet for each RB, a data volume, a queueing time and a historical transmission rate, so as to determine the RBs capable of being adopted for the current data transmission and the quantity of data to be transmitted through each RB.

Then, the MAC layer requests the data at the corresponding data volume from the RLC and PDCP entities corresponding to each scheduled RB in accordance with a scheduling result, and converges the data into a MAC Packet Data Unit (PDU). The MAC PDU is placed in a transmission buffer corresponding to an HARQ entity, and then transmitted at the physical layer through the air interface.

When the uplink scheduling signaling relates to HARQ retransmission, the MAC entity transmits the data in the transmission buffer corresponding to the HARQ entity to the physical layer, and then the data is transmitted through the air interface.

As shown in FIGS. 2 and 3, after the eNB has scheduled for the UE the uplink transmission within the 1 ms TTI, a short TTI resource may probably be scheduled for the UE. Once the 1 ms TTI and the short TTI scheduled by the eNB for the same UE overlaps each other temporally, resource collision may occur (referred to collision between the 1 ms TTI and the short TTI hereinafter).

During the collision between the 1 ms TTI and the short TTI, when the UE is incapable of transmitting the data using the resources scheduled twice simultaneously (e.g., because the resources scheduled twice include a same frequency resources due to the limitation of an uplink transmission capability of the UE), it is impossible to ensure the accurate transmission of the service data.

SUMMARY

An object of the present disclosure is to provide a service data transmission method, a UE and a network side device, so as to enable the UE to map to-be-transmitted data to an uplink resource and transmit the to-be-transmitted data through the uplink resource according to the requirement of the time delay of the to-be transmitted service data when the UE has a capability of processing various TTIs simultaneously (e.g., processing a 1 ms TTI and a short TTI simultaneously) and the UE has received the uplink resource allocated by the eNB.

In one aspect, the present disclosure provides in some embodiments a service data packet transmission method, including: upon the receipt of a scheduling command for an uplink resource from a network side device, acquiring attribute information of to-be-transmitted service data packets, the attribute information of the to-be-transmitted service data packets including a time delay; and mapping the to-be-transmitted service data packets to the uplink resource in accordance with a time delay requirement on the to-be-transmitted service data packets, and transmitting the to-be-transmitted service data packets on the uplink resource.

In a possible embodiment of the present disclosure, the mapping the to-be-transmitted service data packets to the uplink resource in accordance with the time delay requirement on the to-be-transmitted service data packets and transmitting the to-be-transmitted service data packets on the uplink resource includes: determining whether a first transmission time delay for a first scheduled resource indicated by a first scheduling command transmitted from the network side device meets the time delay requirement on the to-be-transmitted service data packets, so as to acquire a determination result; and mapping the to-be-transmitted service data packets to the first scheduled resource or a second scheduled resource indicated by a subsequently-received second scheduling command in accordance with the determination result, and transmitting the to-be-transmitted service data packets on the first scheduled resource or the second scheduled resource. A second transmission time delay for the second scheduled resource is different from the first transmission time delay for the first scheduled resource.

In a possible embodiment of the present disclosure, the first transmission delay is greater than the second transmission delay.

In a possible embodiment of the present disclosure, the mapping the to-be-transmitted service data packets to the first scheduled resource in accordance with the determination result and transmitting the to-be-transmitted service data packets on the first scheduled resource includes: when the first transmission time delay for the first scheduled resource meets a first time delay requirement on a first to-be-transmitted service data packet of the to-be-transmitted service data packets, mapping the first to-be-transmitted service data packet to the first scheduled resource and transmitting the first to-be-transmitted service data packet within the first transmission delay; when the first transmission time delay for the first scheduled resource does not meet the first time delay requirement on the first to-be-transmitted service data packet of the to-be-transmitted service data packets, mapping other to-be-transmitted service data packets of the to-be-transmitted service data packets other than the first to-be-transmitted service data packet to the first scheduled resource and transmitting the other to-be-transmitted service data packets within the first transmission delay.

In a possible embodiment of the present disclosure, when the to-be-transmitted service data packets further include a second to-be-transmitted service data packet having a second time delay requirement higher than the first time delay requirement, the mapping the to-be-transmitted service data packets to the first scheduled resource in accordance with the determination result and transmitting the to-be-transmitted service data packets on the first scheduled resource further includes: mapping the first to-be-transmitted service data packet and at least a part of the second to-be-transmitted service data packet to the first scheduled resource, and transmitting the first to-be-transmitted service data packet and the at least a part of the second to-be-transmitted service data packet within the first transmission time delay.

In a possible embodiment of the present disclosure, the mapping the to-be-transmitted service data packets to the second scheduled resource indicated by the subsequently-received second scheduling command in accordance with the determination result includes, when the first transmission time delay for the first scheduled resource does not meet the first time delay requirement on the first to-be-transmitted service data packet of the to-be-transmitted service data packets and the second scheduled resource having a second transmission time delay indicated by the second scheduling command has been subsequently received from the network side device, mapping the first to-be-transmitted service data packet to the second scheduled resource.

In a possible embodiment of the present disclosure, the service data packet transmission method further includes: when the second scheduled resource indicated by the second scheduling command has been received and the to-be-transmitted service data packets include a second to-be-transmitted service data packet having a time delay requirement lower than the first to-be-transmitted service data packet, terminating the transmission of the first scheduled resource, mapping the second to-be-transmitted service data packet to the second scheduled resource, and transmitting the second to-be-transmitted service data packet on the second scheduled resource; and when the to-be-transmitted service data packets do not include any other data packet having a time delay requirement lower than the first to-be-transmitted service data packet, omitting the second scheduling command.

In a possible embodiment of the present disclosure, the service data packet transmission method further includes, when the transmission time delay for the first scheduled resource does not meet the first time delay requirement on the first to-be-transmitted service data packet of the to-be-transmitted service data packets and the second scheduled resource indicated by the second scheduling command has not been received within a subsequent predetermined time period, transmitting the to-be-transmitted service data packets through initiating a scheduling request for the uplink resource, or transmitting the to-be-transmitted service data packets on a competition resource.

In a possible embodiment of the present disclosure, the mapping the to-be-transmitted service data packets to the uplink resource in accordance with the time delay requirement on the to-be-transmitted service data packets and transmitting the to-be-transmitted service data packets on the uplink resource includes: determining the to-be-transmitted service data packets corresponding to a transmission time delay for a scheduled resource indicated by a currently-received scheduling command in accordance with a preconfigured correspondence between the time delay requirement on the to-be-transmitted service data packets and the scheduled resource; and mapping the to-be-transmitted service data packets to the scheduled resource, and transmitting the to-be-transmitted service data packets on the scheduled resource.

In a possible embodiment of the present disclosure, the determining the to-be-transmitted service data packets corresponding to the transmission time delay for the scheduled resource indicated by the currently-received scheduling command includes: determining other to-be-transmitted service data packets of the to-be-transmitted service data packets other than the first to-be-transmitted service data packet as the to-be-transmitted service data packets corresponding to the transmission time delay for the first scheduled resource indicated by the currently-received scheduling command. The time delay requirement on the first to-be-transmitted service data packet is lower than the time delay requirement on the other to-be-transmitted service data packets.

In a possible embodiment of the present disclosure, subsequent to mapping the other to-be-transmitted service data packets to the first scheduled resource, the service data packet transmission method further includes, when the second scheduled resource indicated by the second scheduling command has not been received within a predetermined time period, transmitting the to-be-transmitted service data packets through initiating a scheduling request for the uplink resource or transmitting the first to-be-transmitted service data packet on a competition resource in accordance with the preconfigured correspondence between the time delay requirement on the to-be-transmitted service data packets and the first scheduled resource.

In a possible embodiment of the present disclosure, the determining the to-be-transmitted service data packets corresponding to the transmission time delay for the scheduled resource indicated by the currently-received scheduling command includes: determining the first to-be-transmitted service data packet of the to-be-transmitted service data packets as the to-be-transmitted service data packets corresponding to the transmission time delay for the second scheduled resource indicated by the currently-received second scheduling command. The time delay requirement on the first to-be-transmitted service data packet is lower than the time delay requirement on the other to-be-transmitted service data packets.

In a possible embodiment of the present disclosure, the service data packet transmission method further includes: when the second scheduled resource indicated by the second scheduling command has been received and the first to-be-transmitted service data packet of the to-be-transmitted service data packets is waiting to be transmitted, terminating the transmission of the first scheduled resource, mapping the first to-be-transmitted service data packet to the second scheduled resource, and transmitting the first to-be-transmitted service data packet on the second scheduled resource; and when the second scheduled resource indicated by the second scheduling command has been received and no first to-be-transmitted service data packet of the to-be-transmitted service data packets is waiting to be transmitted, omitting the second scheduling command.

In a possible embodiment of the present disclosure, the terminating the transmission of the first scheduled resource includes: when it determines to terminate the transmission of the first scheduled resource and a start transmission moment for the first scheduled resource does not arrive, not transmitting the first scheduled resource; or when a start transmission moment for the second scheduled resource arrives, terminating the transmission of the first scheduled resource; or when the start transmission moment for the second scheduled resource arrives, pausing the transmission of the first scheduled resource, and after the transmission of the second scheduled resource is completed, continuing to transmitting a remaining portion of the first scheduled resource.

In a possible embodiment of the present disclosure, subsequent to terminating the transmission of the first scheduled resource, the service data packet transmission method further includes, when a retransmission moment arrives, retransmitting the first scheduled resource in accordance with a retransmission scheduling command.

In a possible embodiment of the present disclosure, the determining the to-be-transmitted service data packets corresponding to the transmission time delay for the scheduled resource indicated by the currently-received scheduling command includes, when the to-be-transmitted service data packets merely have a same transmission time delay requirement and the transmission time delay of the same transmission time delay requirement on the scheduled resource indicated by the currently-received scheduling command is lower than the transmission time delay for the to-be-transmitted service data packets, mapping the to-be-transmitted service data packets to the uplink resource, and transmitting the to-be-transmitted service data packets on the uplink resource.

In another aspect, the present disclosure provides in some embodiments a UE, including: an acquisition module configured to, upon the receipt of a scheduling command for an uplink resource from a network side device, acquire attribute information of to-be-transmitted service data packets, the attribute information of the to-be-transmitted service data packets including a time delay; and a transmission module configured to map the to-be-transmitted service data packets to the uplink resource in accordance with a time delay requirement on the to-be-transmitted service data packets, and transmit the to-be-transmitted service data packets on the uplink resource.

In a possible embodiment of the present disclosure, the transmission module includes: a judgment unit configured to determine whether a first transmission time delay for a first scheduled resource indicated by a first scheduling command transmitted from the network side device meets the time delay requirement on the to-be-transmitted service data packets, so as to acquire a determination result; and a first mapping unit configured to map the to-be-transmitted service data packets to the first scheduled resource or a second scheduled resource indicated by a subsequently-received second scheduling command in accordance with the determination result, and transmit the to-be-transmitted service data packets on the first scheduled resource or the second scheduled resource. A second transmission time delay for the second scheduled resource is different from the first transmission time delay for the first scheduled resource.

In a possible embodiment of the present disclosure, the first transmission delay is greater than the second transmission delay.

In a possible embodiment of the present disclosure, the first mapping unit is further configured to: when the first transmission time delay for the first scheduled resource meets a first time delay requirement on a first to-be-transmitted service data packet of the to-be-transmitted service data packets, map the first to-be-transmitted service data packet to the first scheduled resource and transmit the first to-be-transmitted service data packet within the first transmission delay; when the first transmission time delay for the first scheduled resource does not meet the first time delay requirement on the first to-be-transmitted service data packet of the to-be-transmitted service data packets, map other to-be-transmitted service data packets of the to-be-transmitted service data packets other than the first to-be-transmitted service data packet to the first scheduled resource and transmit the other to-be-transmitted service data packets within the first transmission delay.

In a possible embodiment of the present disclosure, when the to-be-transmitted service data packets further include a second to-be-transmitted service data packet having a second time delay requirement higher than the first time delay requirement, the first mapping unit is further configured to map at least a part of the first to-be-transmitted service data packet and the second to-be-transmitted service data packet to the first scheduled resource, and transmit the at least a part of the first to-be-transmitted service data packet and the second to-be-transmitted service data packet within the first transmission time delay.

In a possible embodiment of the present disclosure, the first mapping unit is further configured to, when the first transmission time delay for the first scheduled resource does not meet the first time delay requirement on the first to-be-transmitted service data packet of the to-be-transmitted service data packets and the second scheduled resource having a second transmission time delay indicated by the second scheduling command has been subsequently received from the network side device, map the first to-be-transmitted service data packet to the second scheduled resource.

In a possible embodiment of the present disclosure, the UE further includes: a second mapping unit configured to, when the second scheduled resource indicated by the second scheduling command has been received and the to-be-transmitted service data packets include a second to-be-transmitted service data packet having a time delay requirement lower than the first to-be-transmitted service data packet, terminate the transmission of the first scheduled resource, map the second to-be-transmitted service data packet to the second scheduled resource, and transmit the second to-be-transmitted service data packet on the second scheduled resource; and a third mapping unit configured to, when the to-be-transmitted service data packets do not include any other data packet having a time delay requirement lower than the first to-be-transmitted service data packet, omit the second scheduling command.

In a possible embodiment of the present disclosure, the UE further includes: a first request transmission module configured to, when the transmission time delay for the first scheduled resource does not meet the first time delay requirement on the first to-be-transmitted service data packet of the to-be-transmitted service data packets and the second scheduled resource indicated by the second scheduling command has not been received within a subsequent predetermined time period, transmit the to-be-transmitted service data packets through initiating a scheduling request for the uplink resource, or transmit the to-be-transmitted service data packets on a competition resource.

In a possible embodiment of the present disclosure, the transmission module includes: a determination unit configured to determine the to-be-transmitted service data packets corresponding to a transmission time delay for a scheduled resource indicated by a currently-received scheduling command in accordance with a preconfigured correspondence between the time delay requirement on the to-be-transmitted service data packets and the scheduled resource; and a transmission unit configured to map the to-be-transmitted service data packets to the scheduled resource, and transmit the to-be-transmitted service data packets on the scheduled resource.

In a possible embodiment of the present disclosure, the determination unit is further configured to: determine other to-be-transmitted service data packets of the to-be-transmitted service data packets other than the first to-be-transmitted service data packet as the to-be-transmitted service data packets corresponding to the transmission time delay for the first scheduled resource indicated by the currently-received scheduling command. The time delay requirement on the first to-be-transmitted service data packet is lower than the time delay requirement on the other to-be-transmitted service data packets.

In a possible embodiment of the present disclosure, the UE further includes a second request transmission module configured to, when the second scheduled resource indicated by the second scheduling command has not been received within a predetermined time period, transmit the to-be-transmitted service data packets through initiating a scheduling request for the uplink resource or transmit the first to-be-transmitted service data packet on a competition resource in accordance the preconfigured correspondence between the time delay requirement on the to-be-transmitted service data packets and the first scheduled resource.

In a possible embodiment of the present disclosure, the determination unit is further configured to: determine the first to-be-transmitted service data packet of the to-be-transmitted service data packets as the to-be-transmitted service data packets corresponding to the transmission time delay for the second scheduled resource indicated by the currently-received second scheduling command. The time delay requirement on the first to-be-transmitted service data packet is lower than the time delay requirement on the other to-be-transmitted service data packets.

In a possible embodiment of the present disclosure, the UE further includes: a fourth mapping unit configured to, when the second scheduled resource indicated by the second scheduling command has been received and the first to-be-transmitted service data packet of the to-be-transmitted service data packets is waiting to be transmitted, terminate the transmission of the first scheduled resource, map the first to-be-transmitted service data packet to the second scheduled resource, and transmit the first to-be-transmitted service data packet on the second scheduled resource; and a fifth mapping unit configured to, when the second scheduled resource indicated by the second scheduling command has been received and no first to-be-transmitted service data packet of the to-be-transmitted service data packets is waiting to be transmitted, omit the second scheduling command.

In a possible embodiment of the present disclosure, the terminating the transmission of the first scheduled resource includes: when it determines to terminate the transmission of the first scheduled resource and a start transmission moment for the first scheduled resource does not arrive, not transmitting the first scheduled resource; or when a start transmission moment for the second scheduled resource arrives, terminate the transmission of the first scheduled resource; or when the start transmission moment for the second scheduled resource arrives, pause the transmission of the first scheduled resource, and after the transmission of the second scheduled resource is completed, continue to transmitting a remaining portion of the first scheduled resource.

In a possible embodiment of the present disclosure, the UE further includes a retransmission module configured to, when a retransmission moment arrives, retransmit the first scheduled resource in accordance with a retransmission scheduling command.

In a possible embodiment of the present disclosure, the determination unit is further configured to, when the to-be-transmitted service data packets merely have a same transmission time delay requirement and the transmission time delay for the scheduled resource indicated by the currently-received scheduling command is lower than the transmission time delay for the to-be-transmitted service data packets, map the to-be-transmitted service data packets to the uplink resource, and transmit the to-be-transmitted service data packets on the uplink resource.

In yet another aspect, the present disclosure provides in some embodiments a service data packet transmission method, including: transmitting a scheduling command for an uplink resource to a UE; and receiving, on the uplink resource indicated by the scheduling command, service data packets which have been mapped by the UE to the uplink resource in accordance with a time delay requirement on the service data packets to be transmitted.

In a possible embodiment of the present disclosure, the receiving, on the uplink resource indicated by the scheduling command, the service data packets which have been mapped by the UE to the uplink resource in accordance with the time delay requirement on the service data packets to be transmitted includes, receiving, from a start transmission moment for a first scheduled resource indicated by a first scheduling command, a service data packet which has been mapped by the UE to the first scheduled resource in accordance with the time delay requirement on the service data packets, or receiving, from a start transmission moment for a second scheduled resource indicated by a second scheduling command, the service data packet which has been mapped by the UE to the first scheduled resource in accordance with the time delay requirement on the service data packets to be transmitted. The service data packets are mapped to the first scheduled resource or the second scheduled resource indicated by the subsequently-received second scheduling command in accordance with a determination result acquired after determining, by the UE, whether a first transmission time delay for the first scheduled resource indicated by the first scheduling command transmitted from a network side device meets the time delay requirement on the service data packets to be transmitted, and then transmitted. A second transmission time delay for the second scheduled resource is different from the first transmission time delay for the first scheduled resource.

In still yet another aspect, the present disclosure provides in some embodiments a network side device, including: a transmission module configured to transmit a scheduling command for an uplink resource to a UE; and a reception module configured to receive, on the uplink resource indicated by the scheduling command, service data packets which have been mapped by the UE to the uplink resource in accordance with a time delay requirement on the service data packets to be transmitted.

In a possible embodiment of the present disclosure, the reception module is further configured to: receive, from a start transmission moment for a first scheduled resource indicated by a first scheduling command, a service data packet which has been mapped by the UE to the first scheduled resource in accordance with the time delay requirement on the service data packets to be transmitted, or receive, from a start transmission moment for a second scheduled resource indicated by a second scheduling command, the service data packet which has been mapped by the UE to the first scheduled resource in accordance with the time delay requirement on the service data packets to be transmitted. The service data packets to be transmitted are mapped to the first scheduled resource or the second scheduled resource indicated by the subsequently-received second scheduling command in accordance with a determination result acquired after determining, by the UE, whether a first transmission time delay for the first scheduled resource indicated by the first scheduling command transmitted from a network side device meets the time delay requirement on the service data packets to be transmitted, and then transmitted. A second transmission time delay for the second scheduled resource is different from the first transmission time delay for the first scheduled resource.

According to the embodiments of the present disclosure, upon the receipt of the scheduling command for the uplink resource from the network side device, the UE acquires the attribute information of the to-be-transmitted service data packets, and the attribute information of the to-be-transmitted service data packets includes the time delay. Then, the UE maps the to-be-transmitted service data packets to the uplink resource in accordance with the time delay requirement on the to-be-transmitted service data packets, and then transmit the to-be-transmitted service data packets on the uplink resource.

DETAILED DESCRIPTION OF THE EMBODIMENTS

In order to make the objects, the technical solutions and the advantages of the present disclosure more apparent, the present disclosure will be described hereinafter in details in conjunction with the drawings and embodiments.

First Embodiment

Figure 1:
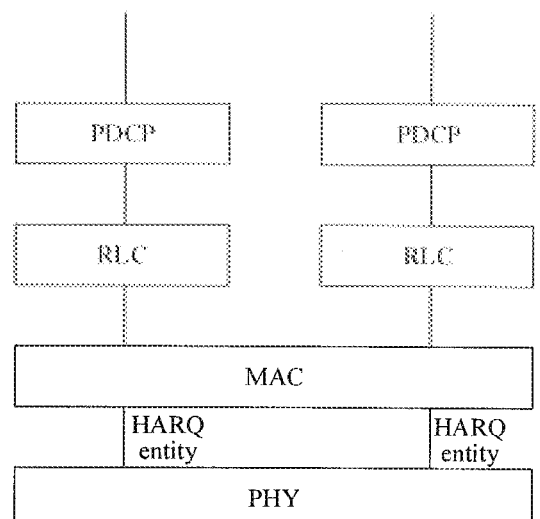
FIG. 1 is a schematic view showing an interactive transmission and processing procedure of a data packet in a UE.
Figure 2:
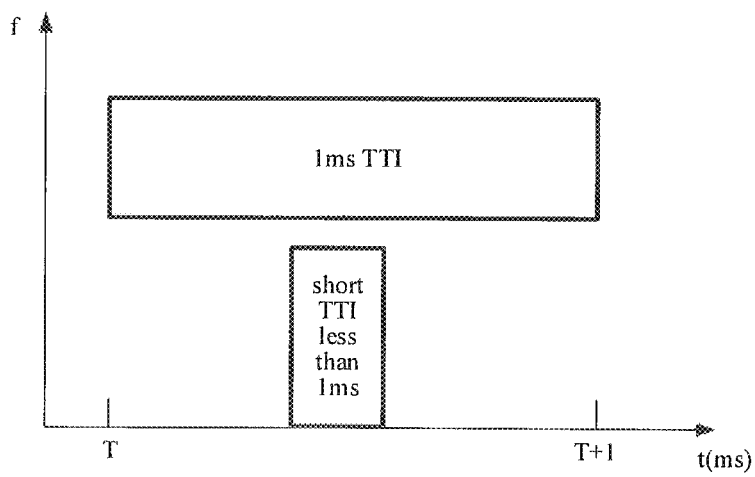
FIG. 2 is a schematic view showing a time relationship between a 1 ms TTI and a short TTI supported by the UE.
Figure 3:
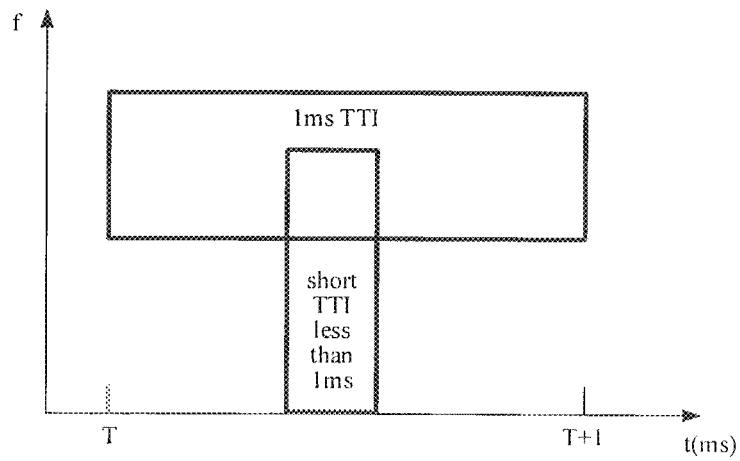
FIG. 3 is a schematic view showing a collision between the 1 ms TTI and the short TTI supported by the UE.
Figure 4:
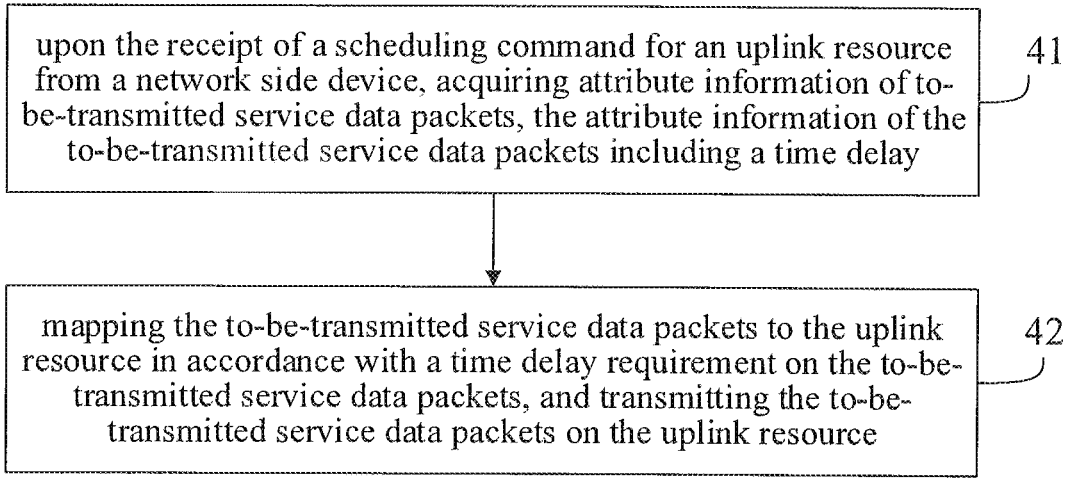
FIG. 4 is a flow chart of a service data packet transmission method according to a first embodiment of the present disclosure.

As shown in FIG. 4, the present disclosure provides in the first embodiment a service data packet transmission method, which includes: Step 41 of, upon the receipt of a scheduling command for an uplink resource from a network side device, acquiring attribute information of to-be-transmitted service data packets, the attribute information of the to-be-transmitted service data packets including a time delay; and Step 42 of mapping the to-be-transmitted service data packets to the uplink resource in accordance with a time delay requirement on the to-be-transmitted service data packets, and transmitting the to-be-transmitted service data packets on the uplink resource.

According to the first embodiment of the present disclosure, when the UE has a capability of processing various TTIs (e.g., a 1 ms TTI and a short TTI) simultaneously and has received the scheduling command for the uplink resource from an eNB, the UE may map the to-be-transmitted service data packets to the uplink resource in accordance with the time delay requirement on the to-be-transmitted service data packets, and transmit the service data packets on the uplink resource.

Second Embodiment

Figure 5:
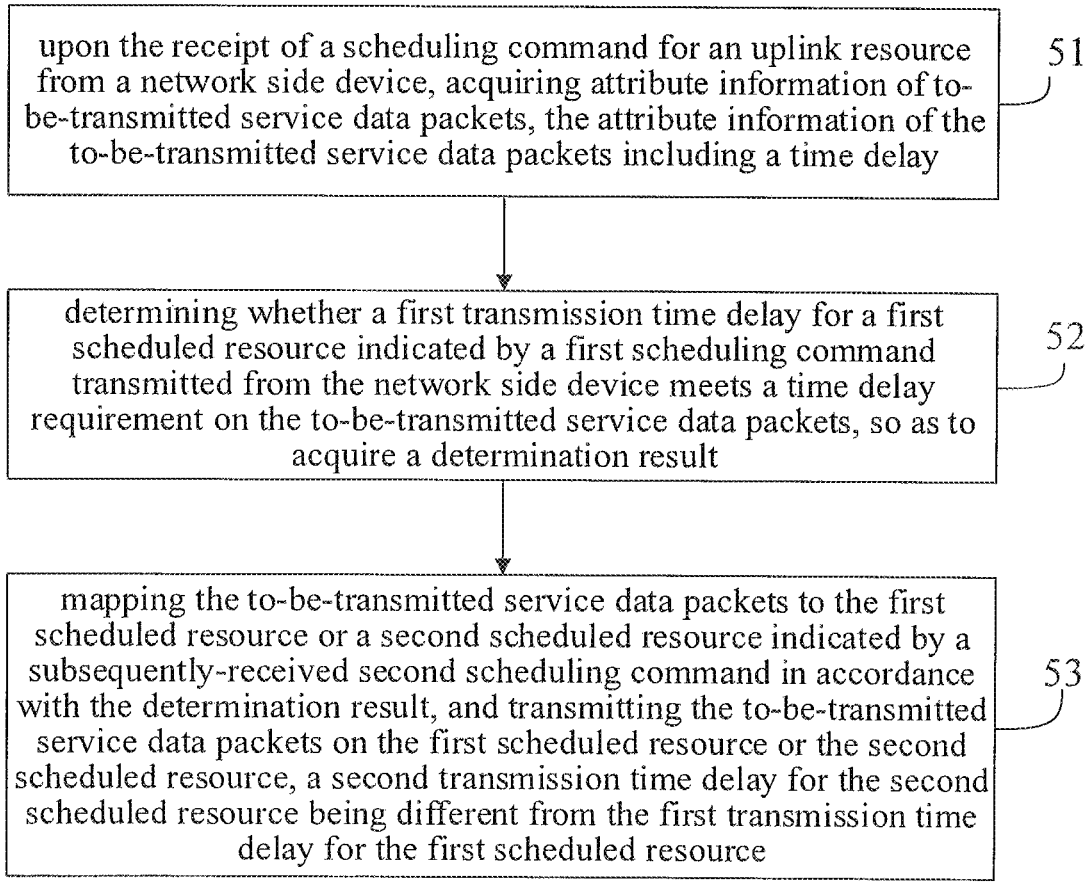
FIG. 5 is another flow chart of the service data packet transmission method according to a second embodiment of the present disclosure.

As shown in FIG. 5S, the present disclosure provides in the second embodiment a service data packet transmission method which includes: Step 51 of, upon the receipt of a scheduling command for an uplink resource from a network side device, acquiring attribute information of to-be-transmitted service data packets, the attribute information of the to-be-transmitted service data packets including a time delay; Step 52 of determining whether a first transmission time delay for a first scheduled resource indicated by a first scheduling command transmitted from the network side device meets a time delay requirement on the to-be-transmitted service data packets, so as to acquire a determination result; and Step 53 of mapping the to-be-transmitted service data packets to the first scheduled resource or a second scheduled resource indicated by a subsequently-received second scheduling command in accordance with the determination result, and transmitting the to-be-transmitted service data packets on the first scheduled resource or the second scheduled resource. A second transmission time delay for the second scheduled resource is different from the first transmission time delay for the first scheduled resource.

When the UE is capable of supporting the transmission of a plurality of scheduled resources having different transmission time delays, the transmission time delays for the scheduled resources may be different from each other.

In a possible embodiment of the present disclosure, the first transmission delay is greater than the second transmission delay.

The following description will be given when the UE is capable of supporting the transmission of two scheduled resources.

In Step 53, the mapping the to-be-transmitted service data packets to the first scheduled resource in accordance with the determination result may include the following Steps.

Step 531: when the first transmission time delay for the first scheduled resource meets a first time delay requirement on a first to-be-transmitted service data packet of the to-be-transmitted service data packets, mapping the first to-be-transmitted service data packet to the first scheduled resource and transmitting the first to-be-transmitted service data packet within the first transmission delay.

In addition, when the to-be-transmitted service data packets include a second to-be-transmitted service data packet having a second time delay requirement and a length required by the second time delay requirement is greater than a length of the first time delay requirement, mapping at least a part of the second to-be-transmitted service data packet and the first to-be-transmitted service data packet to the first scheduled resource, and transmitting the at least a part of the second to-be-transmitted service data packet and the first to-be-transmitted service data packet within the first transmission time delay.

For example, when the to-be-transmitted service data packets in a buffer include a RB1 and other to-be-transmitted service data packets such as a RB2 and a transmission time delay for the RB2 is greater than a transmission time delay for the RB1 (i.e., the RB1 is a low-delay service data packet), the RB1 and a part of the RB2 may be mapped to the first scheduled resource, and then transmitted within the first transmission time delay for the first scheduled resource.

Step 532: when the first transmission time delay for the first scheduled resource does not meet the first time delay requirement on the first to-be-transmitted service data packet of the to-be-transmitted service data packets, mapping other service data packets of the to-be-transmitted service data packets other than the first to-be-transmitted service data packet to the first scheduled resource and transmitting the other service data packets within the first transmission delay.

For example, when the UE is capable of supporting the transmission of the first scheduled resource (Transmission Block (TB)1) corresponding to the 1 ms TTI and the transmission of the second scheduled resource (TB2) corresponding to the short TTI (smaller than the 1 ms TTI), the UE may determine whether the first transmission time delay for the first scheduled resource meets the time delay requirement on the to-be-transmitted service data packets.

When the first transmission time delay for the first scheduled resource (e.g., the time delay for one transmission time or the time delay for the predetermined quantity of retransmission times) meets the first time delay requirement on the first to-be-transmitted service data packet (e.g., the RB1) of the to-be-transmitted service data packets, the first to-be-transmitted service data packet may be mapped to the first scheduled resource, and then transmitted within the first transmission time delay.

When the first transmission time delay for the first scheduled resource does not meet the first time delay requirement on the first to-be-transmitted service data packet (e.g., the RB1) of the to-be-transmitted service data packets, the other service data packets of the to-be-transmitted service data packets other than the first to-be-transmitted service data packet (e.g., the to-be-transmitted service data packets in the buffer include the RB1 and other to-be-transmitted service data packets such as the RB2, and the transmission time delay for the RB2 is greater than the transmission time delay for the RB1, i.e., the RB1 is a low-delay service data packet) may be mapped to the first scheduled resource and transmitted within the first transmission delay. At this time, the RB1 may wait for the second scheduled resource indicated by the second scheduling command.

In Step 53, the mapping the to-be-transmitted service data packets to the second scheduled resource indicated by the subsequently-received second scheduling command in accordance with the determination result may include the following steps. Step 533 of, when the first transmission time delay for the first scheduled resource does not meet the first time delay requirement on the first to-be-transmitted service data packet of the to-be-transmitted service data packets, and the second scheduled resource having a second transmission time delay indicated by the second scheduling command has been subsequently received from the network side device, mapping the first to-be-transmitted service data packet to the second scheduled resource.

Step 534 of, when the transmission time delay for the first scheduled resource does not meet the first time delay requirement on the first to-be-transmitted service data packet of the to-be-transmitted service data packets, and the second scheduled resource indicated by the second scheduling command has not been received within a subsequent predetermined time period, transmitting the to-be-transmitted service data packets through initiating a scheduling request for the uplink resource, or transmitting the to-be-transmitted service data packets on a competition resource.

Third Embodiment

Figure 6:
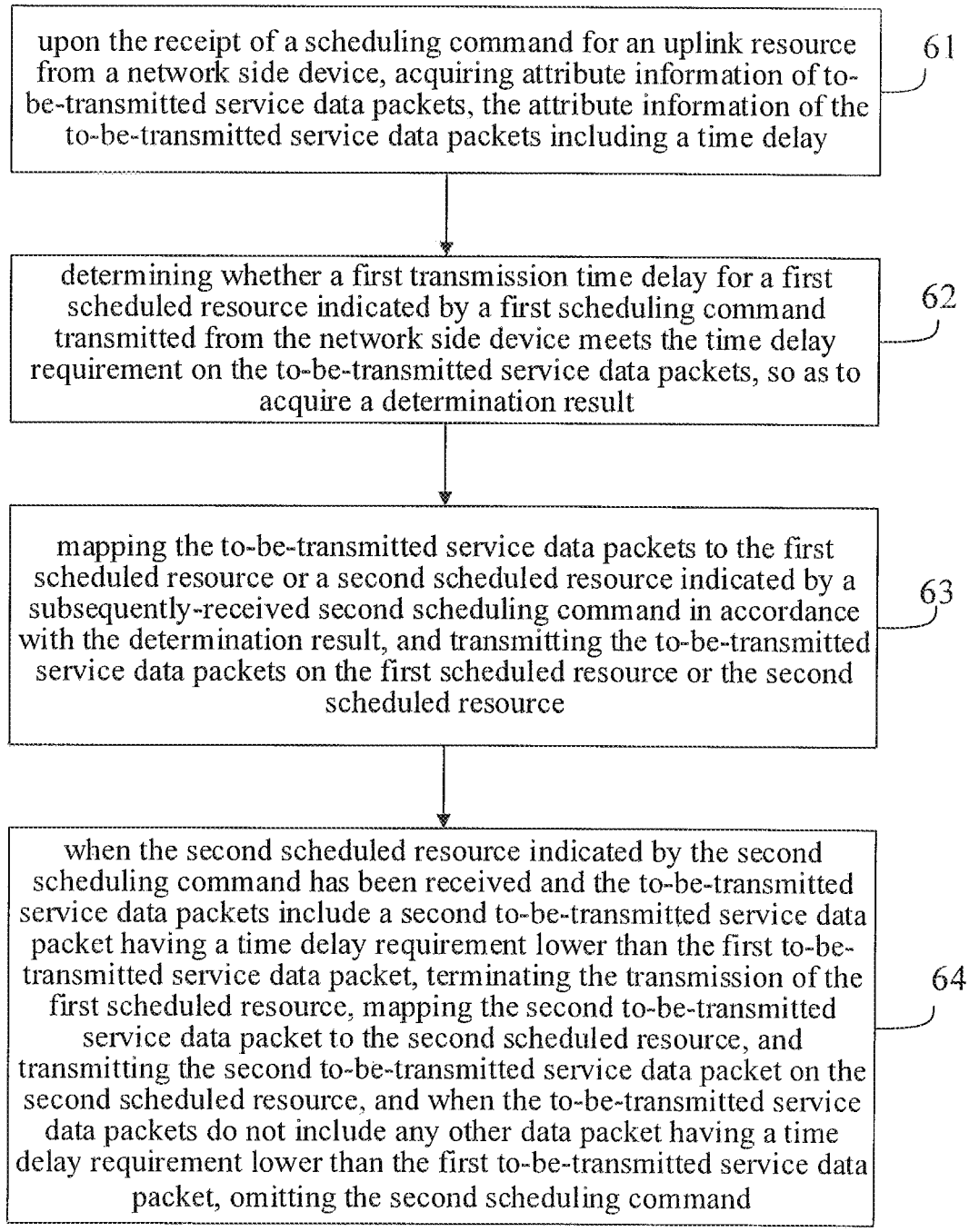
FIG. 6 is yet another flow chart of the service data packet transmission method according to a third embodiment of the present disclosure.

Based on the second embodiment, when there is a collision between the first scheduled resource and the second scheduled resource, as shown in FIG. 6, the present disclosure further provides in a third embodiment a service data packet transmission method which includes: Step 61 of, upon the receipt of a scheduling command for an uplink resource from a network side device, acquiring attribute information of to-be-transmitted service data packets, the attribute information of the to-be-transmitted service data packets including a time delay; Step 62 of determining whether a first transmission time delay for a first scheduled resource indicated by a first scheduling command transmitted from the network side device meets the time delay requirement on the to-be-transmitted service data packets, so as to acquire a determination result; Step 63 of mapping the to-be-transmitted service data packets to the first scheduled resource or a second scheduled resource indicated by a subsequently-received second scheduling command in accordance with the determination result, and transmitting the to-be-transmitted service data packets on the first scheduled resource or the second scheduled resource; and Step 64 of, when the second scheduled resource indicated by the second scheduling command has been received and the to-be-transmitted service data packets include a second to-be-transmitted service data packet having a time delay requirement lower than the first to-be-transmitted service data packet, terminating the transmission of the first scheduled resource, mapping the second to-be-transmitted service data packet to the second scheduled resource, and transmitting the second to-be-transmitted service data packet on the second scheduled resource, and when the to-be-transmitted service data packets do not include any other data packet having a time delay requirement lower than the first to-be-transmitted service data packet, omitting the second scheduling command.

For example, when there is the collision between the 1 ms TTI and the short TTI, the UE may mark a transmission block corresponding to the first scheduled resource within the 1 ms TTI as TB1. At this time, when no service data packet having a lower time delay is to be transmitted (i.e., the service data packet is not mapped to the TB1), the UE may omit the allocation of the second scheduled resource within the short TTI, and transmit the TB1 continuously. When there is a service data packet having a lower time delay is to be transmitted (i.e., the service data packet (e.g., a RB3) having the lower time delay is not mapped to the TB1), the UE may map the service data packet having the lower time delay (e.g., the RB3) to the TB2, and then map and transmit the service data packet having the lower time delay (e.g., the RB3) within the short TTI.

The UE may terminate the transmission of the TB1 within the current 1 ms TTI, and retransmit the TB1 from a next retransmission moment.

Here, the termination of the transmission of the first scheduled resource may include the following two circumstances.

In a first circumstance, when a start transmission moment for the first scheduled resource does not arrive, the transmission of the first scheduled resource may be terminated. For example, a start transmission moment for the transmission block TB1 corresponding to the first scheduled resource is t1, and a start transmission moment for the transmission block TB2 corresponding to the second scheduled resource is t2. When it is determined that the transmission of the TB1 is to be terminated due to the transmission of the TB2 before t1, the TB1 may not be transmitted from t1, and the TB2 may be transmitted from t2.

In a second circumstance, when the start transmission moment for the second scheduled resource arrives, the transmission of the first scheduled resource may be terminated. For example, a data symbol for the TB 1 may not be transmitted merely at a resource position where the TB2 is to be transmitted, i.e., the resource position where the TB2 is to be transmitted is just a punching position for the transmission of the TB1.

When a retransmission moment arrives, the first scheduled resource may be retransmitted in accordance with a retransmission scheduling command.

Figure 7:
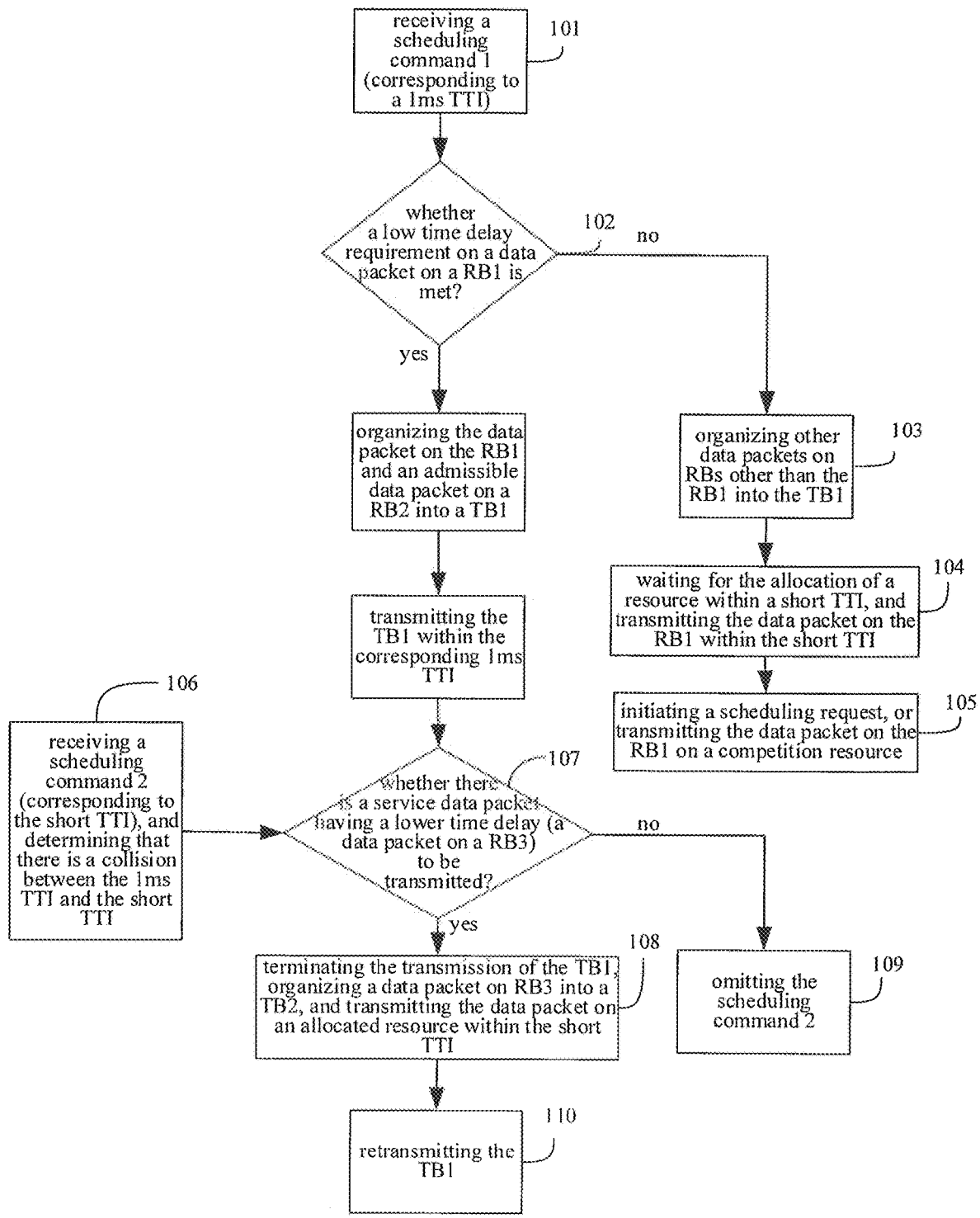
FIG. 7 is a schematic view showing a general procedure of an application scenario of the service data packet transmission method according to the second and third embodiments of the present disclosure.

As shown in FIG. 7, an overall procedure of the above embodiments and the methods corresponding to the second and third embodiments will be described hereinafter in conjunction with a specific scheduling scenario.

In Step 101, a scheduling command 1 (corresponding to the 1 ms TTI) may be received.

In Step 102, whether a transmission time delay for the transmission block TB1 corresponding to the 1 ms TTI meets a time delay requirement on the to-be-transmitted service data packet on the RB1 may be determined.

In Step 103, when the transmission time delay for the transmission block TB1 corresponding to the 1 ms TTI does not meet the time delay requirement on the to-be-transmitted service data packet RB1, merely the other RBs of the to-be-transmitted service data packets in the buffer other than the RB1 may be mapped to the TB1.

In Step 104, it may wait to be scheduled within the short TTI (smaller than the 1 ms TTI), and when there is the short TTI, the RB1 may be mapped to the transmission block TB2 corresponding to the short TTI, and then transmitted within the short TTI.

In Step 105, when there is no short TTI within a predetermined time period, a scheduling request may be initiated or the RB1 may be transmitted on a competition resource.

In Step 106, when the transmission time delay for the transmission block TB1 corresponding to the 1 ms TTI meets the time delay requirement on the to-be-transmitted service data packet RB1, the RB1 or a part or all of the other admissible to-be-transmitted service data packet (i.e., the RB2) may be mapped to the TB1, and then transmitted on the TB1.

In Step 107, when a scheduling command 2 corresponding to the transmission block TB2 within the short TTI has been received subsequently and there is a collision between the short TTI and the 1 ms TTI, whether there is a service data packet (i.e., a RB3) having a smaller time delay in the to-be-transmitted service data packets may be determined in the buffer. The time delay requirement on the RB2 is smaller than the time delay on the RB1, and the time delay requirement on the RB1 is smaller than the time delay requirement on the RB3.

In Step 108, when there is the service data packet (i.e., the RB3), the transmission of the TB1 may be terminated, and the RB3 may be mapped to the TB2 and then transmitted on the TB2. Otherwise, Step 109 may be performed.

In Step 109, the scheduling command 2 may be omitted.

In Step 110, when a retransmission moment for the TB1 arrives, the TB1 may be retransmitted.

Application Scenario 1

Figure 8:
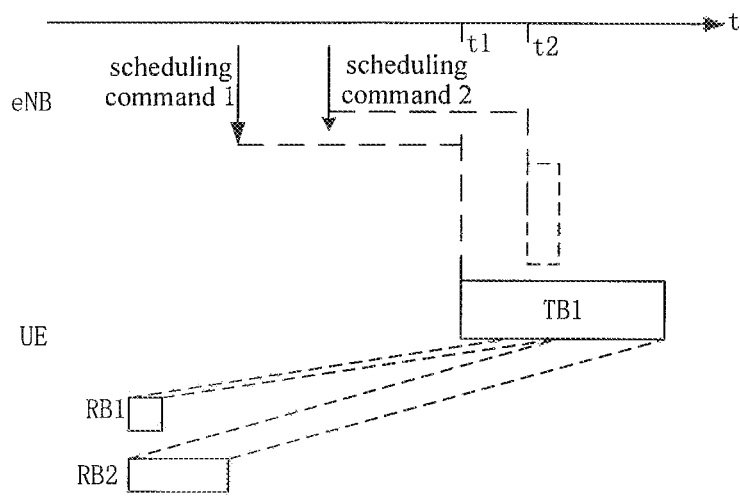
FIG. 8 is a schematic view showing a scheduling and transmission procedure of a service data packet in an application scenario 1 of FIG. 7.

As shown in FIG. 8, the UE may determine whether the low-delay service data packet is to be transmitted within the 1 ms TTI in accordance with whether the time delay requirement is met (i.e., a first circumstance).

The uplink resource within the 1 ms TTI may be allocated in accordance with the scheduling command 1, and then the low-delay service data packet may be transmitted from t1. The uplink resource within the short TTI may be allocated in accordance with the scheduling command 2, and then the low-delay service data packet may be transmitted from t2.

Before the reception of the scheduling command 1, the service data packets buffered by the UE include a data packet on the RB1 and a data packet on the RB2, and the RB1 is a low-delay service bearer.

At a UE side, the following steps will be performed.

Step 1: the UE may receive the scheduling command 1, and determine to that the 1 ms TTI from t1 meets the time delay requirement on the RB1.

Step 2: the data packet on the RB1 and the admissible data packet on the RB2 may be organized into the TB1.

Step 3: the UE may receive the scheduling command 2, determine that there is no other service data packet having a lower time delay requirement, and then omit the scheduling command 2.

Step 4: the TB1 may be transmitted within the 1 ms TTI from t1. It should be appreciated that Step 4 may also be performed subsequent to Step 3 or prior to Step 3.

At a base station side, the following steps will be performed.

Step 1: an eNB may transmit the scheduling command 1, and allocate the uplink transmission resource within the 1 ms TTI from t1.

Step 2: the eNB may transmit the scheduling command 2, and allocate the uplink transmission resource within the short TTI from t2. There is the collision between the 1 ms TTI and the short TTI.

Step 3: the eNB may start to receive the TB1 within the 1 ms TTI from t1, and start to receive the TB2 within the short TTI from t2.

Step 4: the eNB may perform data analysis on the received uplink transmission, receive the TB1 accurately, and determine that there is no data transmission on the TB2.

Application Scenario 2

Figure 9:
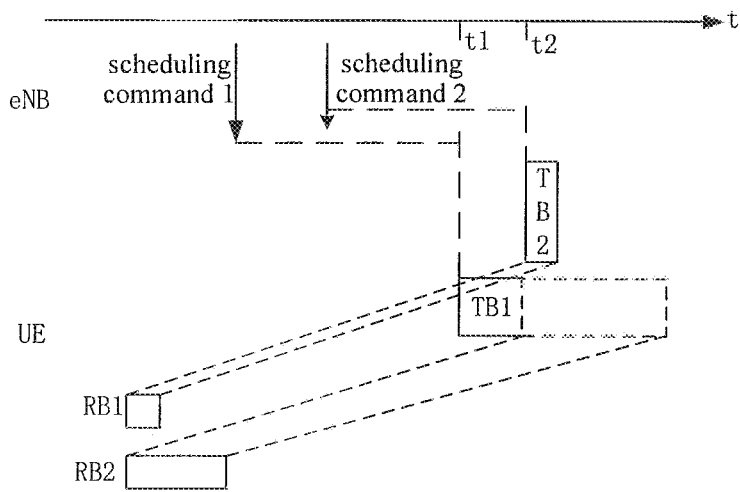
FIG. 9 is a schematic view showing the scheduling and transmission procedure of the service data packet in an application scenario 2 of FIG. 7.

As shown in FIG. 9, the UE may determine whether the low-delay service data packet is to be transmitted within the 1 ms TTI in accordance with whether the time delay requirement is met (i.e., a second circumstance).

The uplink resource within the 1 ms TTI may be allocated in accordance with the scheduling command 1, and then the low-delay service data packet may be transmitted from t1. The uplink resource within the short TTI may be allocated in accordance with the scheduling command 2, and then the low-delay service data packet may be transmitted from t2. Before the reception of the scheduling command 1, the bearer data packets buffered by the UE are a data packet on the RB1 and a data packet on the RB2, and the RB1 is a low-delay service bearer.

At the UE side, the following steps will be performed.

Step 1: the UE may receive the scheduling command 1, and determine that the 1 ms TTI from t1 does not meet the time delay requirement on the RB1.

Step 2: the data packet on the RB2 may be organized into the TB1.

Step 3: the TB1 may be transmitted within the 1 ms TTI from t1.

Step 4: The UE may receive the scheduling command 2, and organize the data packet on the RB1 into the TB2.

Step 5: the transmission of the TB1 may terminated and the TB2 may be transmitted from t2.

Step 5 may be optimized in two modes. In Mode 1, when the transmission of the TB1 is determined to be terminated due to the transmission of the TB2 before t1, the TB1 may not be transmitted from t1, and the TB2 may be transmitted from t2. In Mode 2, a data symbol for the TB1 may not be transmitted merely at a resource position where the TB2 is to be transmitted, i.e., the resource position where the TB2 is to be transmitted is just a punching position for the transmission of the TB1. In Mode 2, the eNB may probably parse the TB1 accurately.

Step 6: the UE may retransmit the TB1. When the above Mode 2 in Step 5 is not taken into consideration, the TB1 may be transmitted unsuccessfully by default.

At the base station side, the following steps will be performed.

Step 1: the eNB may transmit the scheduling command 1, and allocate the uplink transmission resource within the 1 ms TTI from t1.

Step 2: the eNB may transmit the scheduling command 2, and allocate the uplink resource within the short TTI from t2. There is the collision between the 1 ms TTI and the short TTI. Step 3: the eNB may receive the TB1 within the 1 ms TTI from t1, and receive the TB2 within the short TTI from t2.

Step 4: the eNB may perform data analysis on the received uplink transmission, receive the TB2 accurately, and determine that the transmission of the TB1 is to be terminated (or the eNB may probably receive the TB1 accurately in accordance with the above Mode 2 in Step 5 at the UE side).

Application Scenario 3

Figure 10:
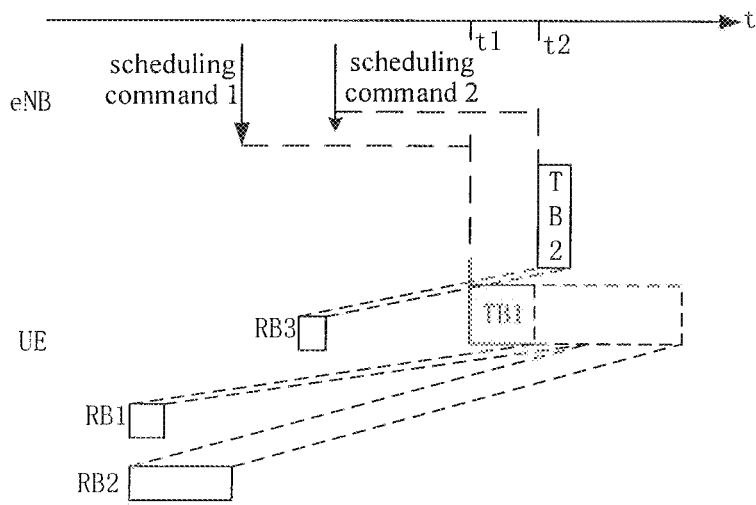
FIG. 10 is a schematic view showing the scheduling and transmission procedure of the service data packet in an application scenario 3 of FIG. 7.

As shown in FIG. 10, the UE may determine whether the low-delay service data packet is to be transmitted within the 1 ms TTI in accordance with whether the time delay requirement is met (i.e., a third circumstance).

The uplink resource within the 1 ms TTI may be allocated in accordance with the scheduling command 1, and then the low-delay service data packet may be transmitted from t1. The uplink resource within the short TTI may be allocated in accordance with the scheduling command 2, and then the low-delay service data packet may be transmitted from t2. Before the scheduling command 1, the bearer data packets buffered by the UE are a data packet on the RB1 and a data packet on the RB2, and the RB1 is a low-delay service bearer. After the scheduling command 1, a service data packet on the RB3 having a lower time delay may be buffered at the UE.

At the UE side, the following steps will be performed.

Step 1: the UE may receive the scheduling command 1, and determine that the 1 ms TTI from t1 meets the time delay requirement on the RB1.

Step 2: the data packet on the RB1 and the admissible data packet on the RB2 may be organized into the TB1.

Step 3: the TB1 may be transmitted within the 1 ms TTI from t1.

Step 4: the UE may receive the scheduling command 2, determine that a service data packet on the RB3 having a lower delay requirement is to be transmitted, and then organize it into the TB2.

Step 5: the transmission of the TB1 may be terminated and the TB2 may be transmitted from t2.

Step 5 may be optimized in two modes. In Mode 1, when the transmission of the TB1 is determined to be terminated due to the transmission of the TB2 before t1, the TB1 may not be transmitted from t1, and the TB2 may be transmitted from t2. In Mode 2, a data symbol for the TB1 may not be transmitted merely at a resource position where the TB2 is to be transmitted, i.e., the resource position where the TB2 is to be transmitted is just a punching position for the transmission of the TB1. In Mode 2, the eNB may probably parse the TB1 accurately.

Step 6: the UE may retransmit the TB 1. When the above Mode 2 in Step 5 is not taken into consideration, the TB1 may be transmitted unsuccessfully by default.

At the base station side, the following steps will be performed.

Step 1: the eNB may transmit the scheduling command 1, and allocate the uplink transmission resource within the 1 ms TTI from t.

Step 2: the eNB may transmit the scheduling command 2, and allocate the uplink transmission resource within the short TTI from t2. There is the resource collision between the 1 ms TTI and the short TTI.

Step 3: the eNB may receive the TB1 within the 1 ms TTI from t1, and receive the TB2 within the short TTI from t2.

Step 4: the eNB may perform data analysis on the received uplink transmission, receive the TB2 accurately, and determine that the transmission of the TB1 is to be terminated (or the eNB may probably receive the TB1 accurately in accordance with the above Mode 2 in Step 5 at the UE side).

Fourth Embodiment

Figure 11:
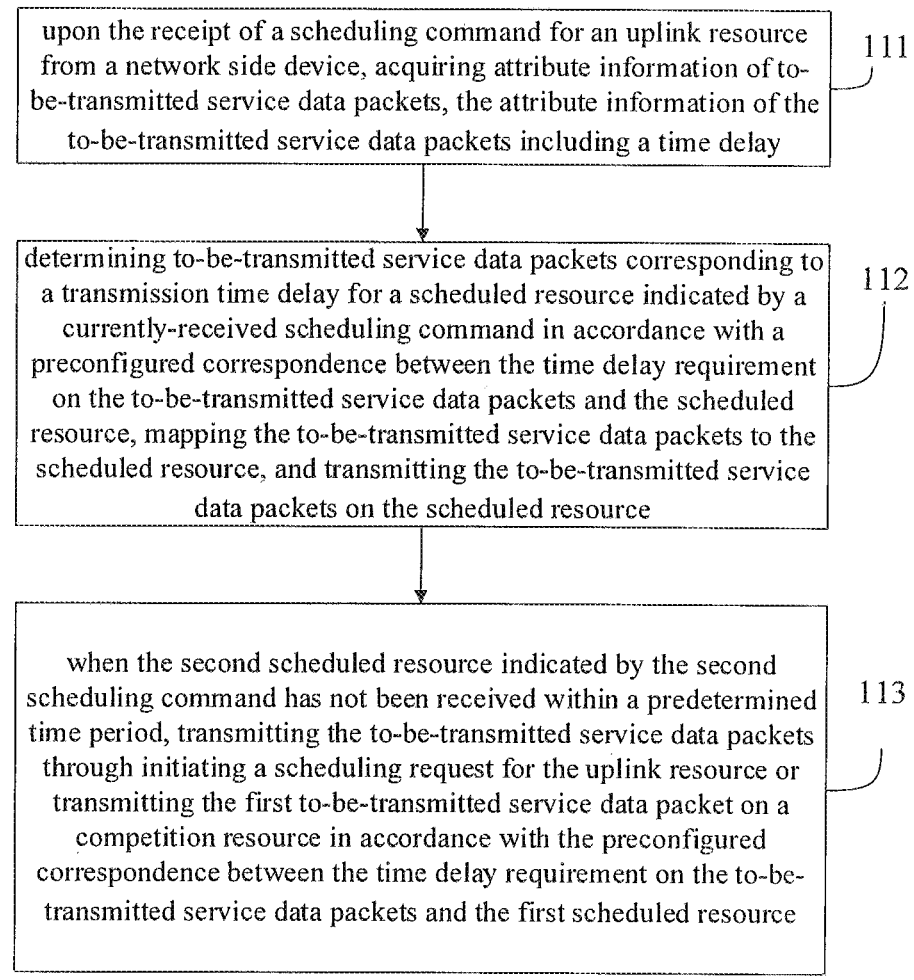
FIG. 11 is still yet another flow chart of the service data packet transmission method according to a fourth embodiment of the present disclosure.

As shown in FIG. 11, the present disclosure further provides in this embodiment a service data packet transmission method which includes: Step 111 of, upon the receipt of a scheduling command for an uplink resource from a network side device, acquiring attribute information of to-be-transmitted service data packets, the attribute information of the to-be-transmitted service data packets including a time delay; and Step 112 of determining to-be-transmitted service data packets corresponding to a transmission time delay for a scheduled resource indicated by a currently-received scheduling command in accordance with a preconfigured correspondence between the time delay requirement on the to-be-transmitted service data packets and the scheduled resource, mapping the to-be-transmitted service data packets to the scheduled resource, and transmitting the to-be-transmitted service data packets on the scheduled resource.

To be specific, other to-be-transmitted service data packets of the to-be-transmitted service data packets other than the first to-be-transmitted service data packet may be determined as the to-be-transmitted service data packets corresponding to the transmission time delay for the first scheduled resource indicated by the currently-received scheduling command. The time delay requirement on the first to-be-transmitted service data packet may be lower than the time delay requirement on the other to-be-transmitted service data packets.

In addition, the service data packet transmission method may further include Step 113 of, when the second scheduled resource indicated by the second scheduling command has not been received within a predetermined time period, transmitting the to-be-transmitted service data packets through initiating a scheduling request for the uplink resource or transmitting the first to-be-transmitted service data packet on a competition resource in accordance with the preconfigured correspondence between the time delay requirement on the to-be-transmitted service data packets and the first scheduled resource.

Fifth Embodiment

Figure 12:
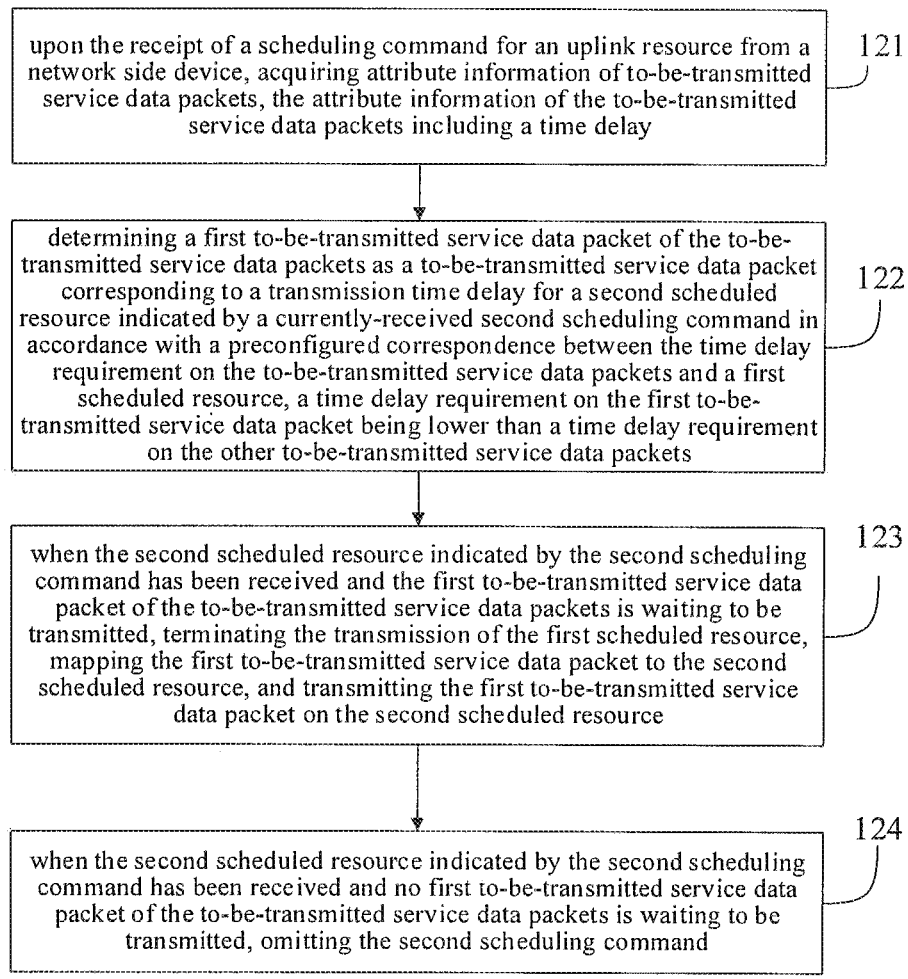
FIG. 12 is a still yet another flow chart of the service data packet transmission method according to a fifth embodiment of the present disclosure.

As shown in FIG. 12, the present disclosure further provides in this embodiment a service data packet transmission method which includes: Step 121 of, upon the receipt of a scheduling command for an uplink resource from a network side device, acquiring attribute information of to-be-transmitted service data packets, the attribute information of the to-be-transmitted service data packets including a time delay; and Step 122 of determining a first to-be-transmitted service data packet of the to-be-transmitted service data packets as a to-be-transmitted service data packet corresponding to a transmission time delay for a second scheduled resource indicated by a currently-received second scheduling command in accordance with a preconfigured correspondence between the time delay requirement on the to-be-transmitted service data packets and a first scheduled resource. A time delay requirement on the first to-be-transmitted service data packet may be lower than a time delay requirement on the other to-be-transmitted service data packets.

In addition, the service data packet transmission method may further include: Step 123 of, when the second scheduled resource indicated by the second scheduling command has been received and the first to-be-transmitted service data packet of the to-be-transmitted service data packets is waiting to be transmitted, terminating the transmission of the first scheduled resource, mapping the first to-be-transmitted service data packet to the second scheduled resource, and transmitting the first to-be-transmitted service data packet on the second scheduled resource; and Step 124 of, when the second scheduled resource indicated by the second scheduling command has been received and no first to-be-transmitted service data packet of the to-be-transmitted service data packets is waiting to be transmitted, omitting the second scheduling command.

Here, the termination of the transmission of the first scheduled resource may include the following three circumstances.

In a first circumstance, when the transmission of the first scheduled resource is determined to be terminated, and a start transmission moment for the first scheduled resource does not arrive, the transmission of the first scheduled resource may be terminated. For example, a start transmission moment for the transmission block TB 1I corresponding to the first scheduled resource is t1, and a start transmission moment for the transmission block TB2 corresponding to the second scheduled resource is t2. When it is determined that the transmission of the TB1 is to be terminated due to the transmission of the TB2 before t1, the TB1 may not be transmitted from t1, and the TB2 may be transmitted from t2.

In a second circumstance, when the start transmission moment for the second scheduled resource arrives, the transmission of the first scheduled resource may be terminated. For example, a data symbol for the TB1 may not be transmitted merely at a resource position where the TB2 is to be transmitted, i.e., the resource position where the TB2 is to be transmitted is just a punching position for the transmission of the TB1.

In a third circumstance, when the start transmission moment for the second scheduled resource arrives, the transmission of the first scheduled resource may be paused, and after the transmission of the second scheduled resource is completed, a remaining part of the first scheduled resource may be transmitted continuously.

When a retransmission moment arrives, the first scheduled resource may be retransmitted in accordance with a retransmission scheduling command.

Sixth Embodiment

Figure 13:
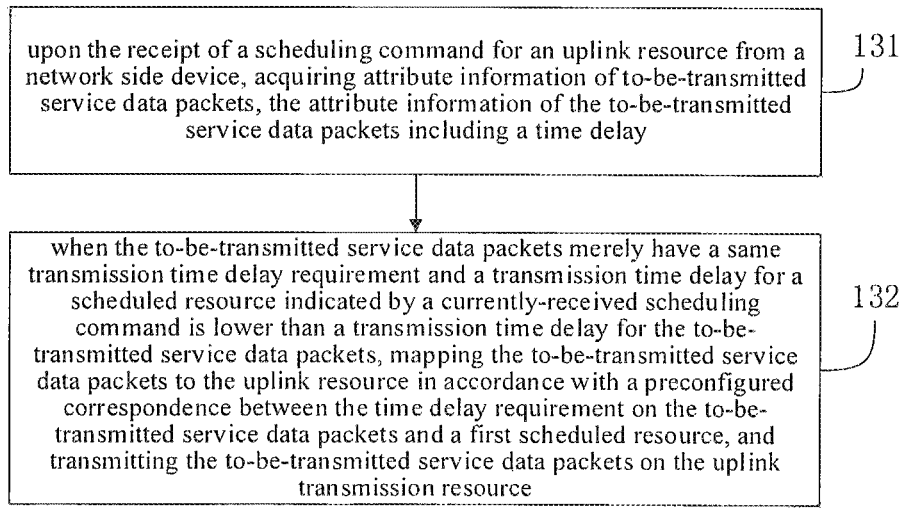
FIG. 13 is still another flow chart of the service data packet transmission method according to a sixth embodiment of the present disclosure.

As shown in FIG. 13, the present disclosure further provides in this embodiment a service data packet transmission method which includes: Step 131 of, upon the receipt of a scheduling command for an uplink resource from a network side device, acquiring attribute information of to-be-transmitted service data packets, the attribute information of the to-be-transmitted service data packets including a time delay; and Step 132 of, when the to-be-transmitted service data packets merely have a same transmission time delay requirement and a transmission time delay for a scheduled resource indicated by a currently-received scheduling command is lower than a transmission time delay for the to-be-transmitted service data packets, mapping the to-be-transmitted service data packets to the uplink resource in accordance with a preconfigured correspondence between the time delay requirement on the to-be-transmitted service data packets and a first scheduled resource, and transmitting the to-be-transmitted service data packets on the uplink transmission resource.

Figure 14:
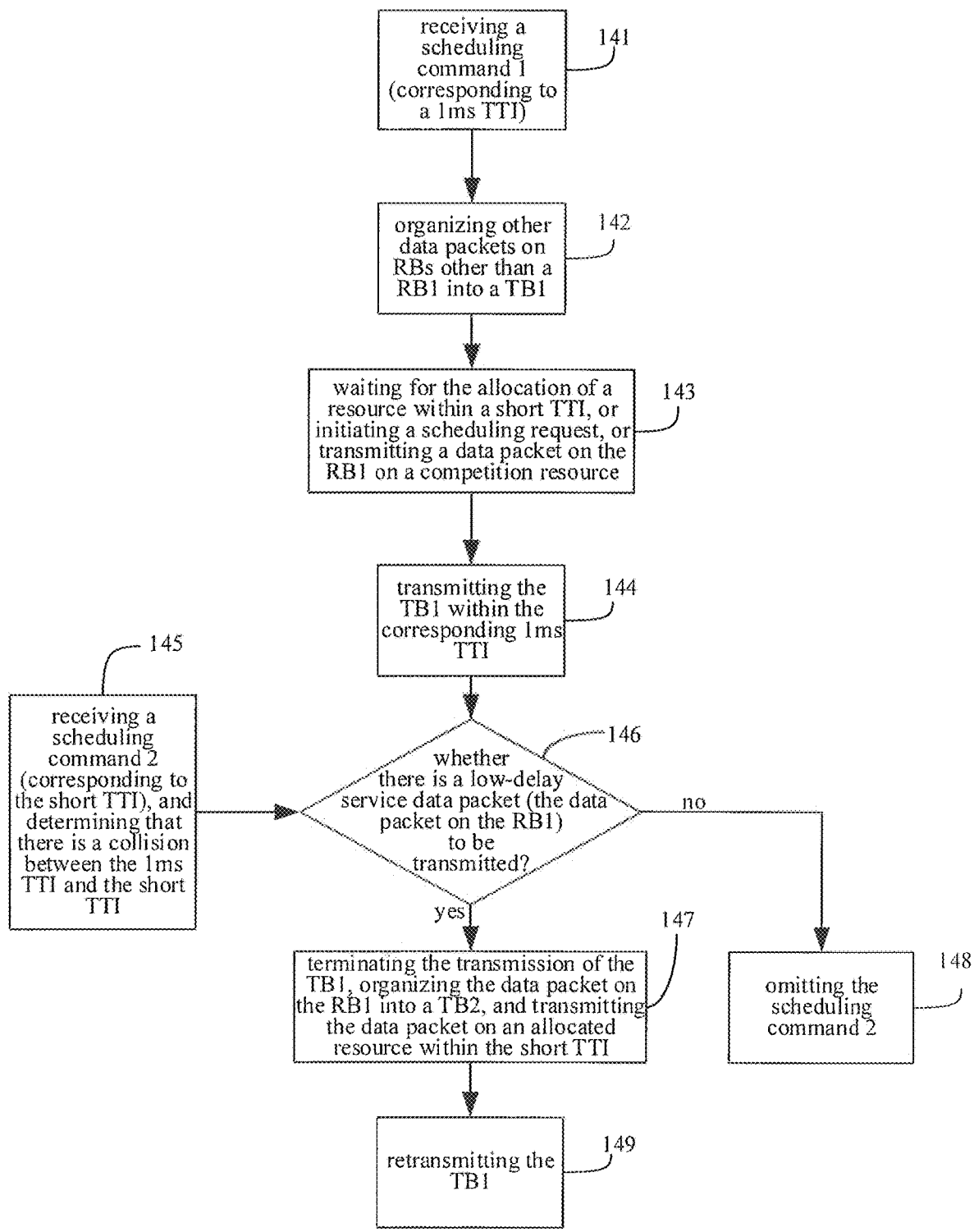
FIG. 14 is a schematic view showing a general procedure of an application scenario of the service data packet transmission method according to the fourth, fifth and sixth embodiments of the present disclosure.

As shown in FIG. 14, an overall procedure of the above embodiments and the methods corresponding to the fourth to sixth embodiments will be described hereinafter in conjunction with a specific scheduling scenario.

In Step 141, a scheduling command 1 (corresponding to the 1 ms TTI) may be received.

In Step 142, the data packet on the RBs other than the RB1 may be mapped onto the TB1.

In Step 143, the second scheduling resource TB2 may wait to be scheduled within the short TTI, and when there is the short TTI, the RB1 may be mapped to the transmission block TB2 corresponding to the short TTI, and then transmitted within the short TTI. Alternatively, when there is no short TTI within a predetermined time period, a scheduling request may be initiated, or the data packet on the RB1 may be transmitted on a competition resource.

In Step 144, when a start transmission moment for the TB1 arrives, the TB1 may be transmitted.

In Step 145, when the scheduling command 2 corresponding to the short TTI has been received, whether there is the collision between the short TTI and the 1 ms TTI may be determined.

In Step 146, whether there is a low-delay service data packet (RB1) in the to-be-transmitted service data packets may be determined in the buffer.

In Step 147, when there is the low-low service data packet in the to-be-transmitted service data packets, the transmission of the TB1 may be terminated, and the data packet on the RB1 may be mapped to the TB2 and transmitted on the TB2. Otherwise, Step 148 may be performed.

In Step 148, the scheduling command 2 may be omitted. In a possible embodiment of the present disclosure, when the resource within the short TTI has been allocated for the UE but there is no low-delay service data packet in the buffer, the other service data packet (RB2) may also be transmitted.

In Step 149, when a retransmission moment for the TB1 arrives, the TB1 may be retransmitted.

Application Scenario 1

Figure 15:
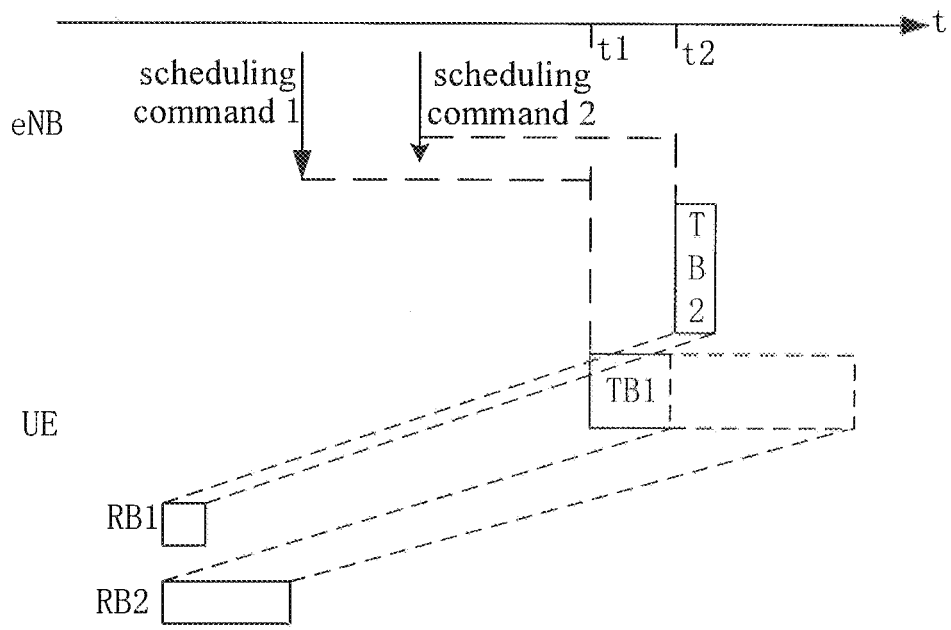
FIG. 15 is a schematic view showing a scheduling and transmission procedure of the service data packet in an application scenario 1 of FIG. 14.

As shown in FIG. 15, the UE may transmit the data packets having different time delay requirements in accordance with a length of the TTI (i.e., a first circumstance).

The uplink resource within the 1 ms TTI may be allocated in accordance with the scheduling command 1, and then it may be transmitted from t1. The uplink resource within the short TTI may be allocated in accordance with the scheduling command 2, and then it may be transmitted from t2. Before the scheduling command 1, the bearer data packets buffered by the UE are a data packet on the RB1 and a data packet on the RB2, and the RB1 is a low-delay service bearer.

At the UE side, the following steps will be performed.

Step 1: the UE may receive the scheduling command 1, and determine that the allocated resource is for the 1 ms TTI.

Step 2: the UE may organize the data packet on the RB2 into the TB1.

Step 3: the UE may transmit the TB1 within the 1 ms TTI from t1.

Step 4: the UE may receive a second scheduling command 2, and organize the data packet on the RB1 into the TB2.

Step 5: the UE may terminate the transmission of the TB1 and transmit the TB2 from t2.

Step 5 may be optimized in two modes. In Mode 1, when the transmission of the TB1 is determined to be terminated due to the transmission of the TB2 before t1, the TB1 may not be transmitted from t1, and the TB2 may be transmitted from t2. In Mode 2, a data symbol for the TB1 may not be transmitted merely at a resource position where the TB2 is to be transmitted, i.e., the resource position where the TB2 is to be transmitted is just a punching position for the transmission of the TB. In Mode 2, the eNB may probably parse the TB1 accurately.

Step 6: the UE may retransmit the TB1. When the above Mode 2 in Step 5 is not taken into consideration, the TB1 may be transmitted unsuccessfully by default.

At the base station side, the following steps will be performed.

Step 1: the eNB may transmit the scheduling command 1, and allocate the uplink transmission resource within the 1 ms TTI from t1.

Step 2: the eNB may transmit the scheduling command 2, and allocate the uplink transmission resource within the short TTI from t2. There is the collision between the 1 ms TTI and the short TTI.

Step 3: the eNB may receive the TB1 within the 1 ms TTI from t1, and receive the TB2 within the short TTI from t2.

Step 4: the eNB may perform data analysis on the received uplink transmission, receive the TB2 accurately, and determine that the transmission of the TB1 is to be terminated (or the eNB may probably receive the TB1 accurately in accordance with the above Mode 2 in Step 5 at the UE side).

Scenario 2

Figure 16:
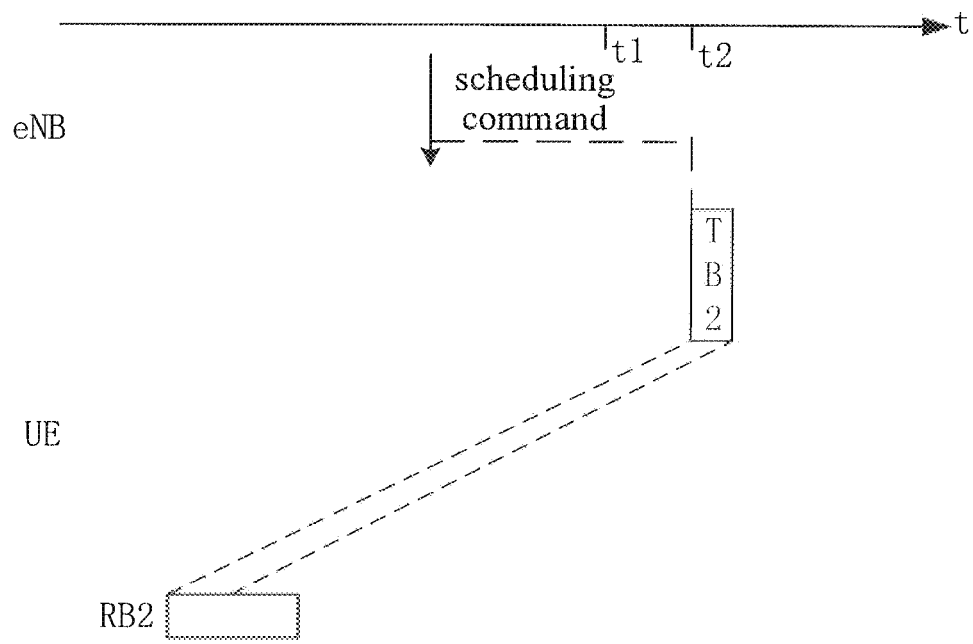
FIG. 16 is a schematic view showing the scheduling and transmission procedure of the service data packet in an application scenario 2 of FIG. 14.

As shown in FIG. 16, the UE may transmit the data packets having different time delay requirements in accordance with a length of the TTI (i.e., a second circumstance).

The uplink resource within the short TTI may be allocated in accordance with the scheduling command, and the data packets may be transmitted from t2. Before the reception of the scheduling command, the bearer data packets in the buffer of the UE merely include the data packet on the RB2 having a low time delay requirement.

At the UE side, the following steps will be performed.

Step 1: the UE may receive the scheduling command, and determine that the allocated resource is for the short TTI.

Step 2: the UE may organize the data packet on the RB2 into the TB2.

Step 3: the UE may transmit the TB within the short TTI from t2.

At the base station side, the following steps will be performed.

Step 1: the eNB may transmit the scheduling command, and allocate the uplink transmission resource within the short TTI from t2.

Step 2: the eNB may receive the TB2 within the short TTI from t2.

Step 3: the eNB may perform data analysis on the received uplink transmission, and receive the TB2 accurately.

The methods in the above-mentioned embodiments may be adapted to, but not limited to a common scenario where there is a collision between a long TI (including, but not limited to, the 1 ms TTI) and a short TTI. When there is the collision between the 1 ms TTI and the short TTI, and the UE is incapable of transmitting the data through the resource scheduled twice, through the methods in the above-mentioned embodiments of the present disclosure, it is able to transmit the time-delay-sensitive service data preferentially.

Seventh Embodiment

The present disclosure further provides in this embodiment a UE which includes: an acquisition module configured to, upon the receipt of a scheduling command for an uplink resource from a network side device, acquire attribute information of to-be-transmitted service data packets, the attribute information of the to-be-transmitted service data packets including a time delay; and a transmission module configured to map the to-be-transmitted service data packets to the uplink resource in accordance with a time delay requirement on the to-be-transmitted service data packets, and transmit the to-be-transmitted service data packets on the uplink transmission resource.

In a possible embodiment of the present disclosure, the transmission module includes: a judgment unit configured to determine whether a first transmission time delay for a first scheduled resource indicated by a first scheduling command transmitted from the network side device meets the time delay requirement on the to-be-transmitted service data packets, so as to acquire a determination result; and a first mapping unit configured to map the to-be-transmitted service data packets to the first scheduled resource or a second scheduled resource indicated by a subsequently-received second scheduling command in accordance with the determination result, and transmit the to-be-transmitted service data packets on the first scheduled resource or the second scheduled resource. A second transmission time delay for the second scheduled resource is different from the first transmission time delay for the first scheduled resource.

In a possible embodiment of the present disclosure, the first transmission delay is greater than the second transmission delay.

In a possible embodiment of the present disclosure, the first mapping unit is further configured to: when the first transmission time delay for the first scheduled resource meets a first time delay requirement on a first to-be-transmitted service data packet of the to-be-transmitted service data packets, map the first to-be-transmitted service data packet to the first scheduled resource and transmit the first to-be-transmitted service data packet within the first transmission delay; when the first transmission time delay for the first scheduled resource does not meet the first time delay requirement on the first to-be-transmitted service data packet of the to-be-transmitted service data packets, map service data packets of the to-be-transmitted service data packets other than the first to-be-transmitted service data packet to the first scheduled resource and transmit the service data packets within the first transmission delay.

In a possible embodiment of the present disclosure, when the to-be-transmitted service data packets include a second to-be-transmitted service data packet having a second time delay requirement and a length of the second time delay requirement is greater than a length of the first time delay requirement, the first mapping unit is further configured to map at least a part of the second to-be-transmitted service data packet and the first to-be-transmitted service data packet to the first scheduled resource, and transmit the at least a part of the second to-be-transmitted service data packet and the first to-be-transmitted service data packet within the first transmission time delay.

In a possible embodiment of the present disclosure, the first mapping unit is further configured to, when the first transmission time delay for the first scheduled resource does not meet the first time delay requirement on the first to-be-transmitted service data packet of the to-be-transmitted service data packets and the second scheduled resource having a second transmission time delay indicated by the second scheduling command has been subsequently received from the network side device, map the first to-be-transmitted service data packet to the second scheduled resource.

In a possible embodiment of the present disclosure, the UE further includes: a second mapping unit configured to, when the second scheduled resource indicated by the second scheduling command has been received and the to-be-transmitted service data packets include a second to-be-transmitted service data packet having a time delay requirement lower than the first to-be-transmitted service data packet, terminate the transmission of the first scheduled resource, map the second to-be-transmitted service data packet to the second scheduled resource, and transmit the second to-be-transmitted service data packet on the second scheduled resource; and a third mapping unit configured to, when the to-be-transmitted service data packets do not include any other data packet having a time delay requirement lower than the first to-be-transmitted service data packet, omit the second scheduling command.

In a possible embodiment of the present disclosure, the UE further includes a first request transmission module configured to, when the transmission time delay for the first scheduled resource does not meet the first time delay requirement on the first to-be-transmitted service data packet of the to-be-transmitted service data packets and the second scheduled resource indicated by the second scheduling command has not been received within a subsequent predetermined time period, transmit the to-be-transmitted service data packets through initiating a scheduling request for the uplink resource, or transmit the to-be-transmitted service data packets on a competition resource.

In a possible embodiment of the present disclosure, the transmission module includes: a determination unit configured to determine the to-be-transmitted service data packets corresponding to a transmission time delay for a scheduled resource indicated by a currently-received scheduling command in accordance with a preconfigured correspondence between the time delay requirement on the to-be-transmitted service data packets and the scheduled resource; and a transmission unit configured to map the to-be-transmitted service data packets to the scheduled resource, and transmit the to-be-transmitted service data packets on the scheduled resource.

In a possible embodiment of the present disclosure, the determination unit is further configured to determine other to-be-transmitted service data packets of the to-be-transmitted service data packets other than the first to-be-transmitted service data packet as the to-be-transmitted service data packets corresponding to the transmission time delay for the first scheduled resource indicated by the currently-received scheduling command. The time delay requirement on the first to-be-transmitted service data packet is lower than the time delay requirement on the other to-be-transmitted service data packets.

In a possible embodiment of the present disclosure, the UE further includes a second request transmission module configured to, when the second scheduled resource indicated by the second scheduling command has not been received within a predetermined time period, transmit the to-be-transmitted service data packets through initiating a scheduling request for the uplink resource or transmit the first to-be-transmitted service data packet on a competition resource in accordance with the preconfigured correspondence between the time delay requirement on the to-be-transmitted service data packets and the first scheduled resource.

In a possible embodiment of the present disclosure, the determination unit is further configured to determine the first to-be-transmitted service data packet of the to-be-transmitted service data packets as the to-be-transmitted service data packets corresponding to the transmission time delay for the second scheduled resource indicated by the currently-received second scheduling command. The time delay requirement on the first to-be-transmitted service data packet is lower than the time delay requirement on the other to-be-transmitted service data packets.

In a possible embodiment of the present disclosure, the UE further includes: a fourth mapping unit configured to, when the second scheduled resource indicated by the second scheduling command has been received and the first to-be-transmitted service data packet of the to-be-transmitted service data packets is waiting to be transmitted, terminate the transmission of the first scheduled resource, map the first to-be-transmitted service data packet to the second scheduled resource, and transmit the first to-be-transmitted service data packet on the second scheduled resource; and a fifth mapping unit configured to, when the second scheduled resource indicated by the second scheduling command has been received and no first to-be-transmitted service data packet of the to-be-transmitted service data packets is waiting to be transmitted, omit the second scheduling command.

In a possible embodiment of the present disclosure, the terminating the transmission of the first scheduled resource includes: when it determines to terminate the transmission of the first scheduled resource and a start transmission moment for the first scheduled resource does not arrive, not transmitting the first scheduled resource; or when a start transmission moment for the second scheduled resource arrives, terminate the transmission of the first scheduled resource; or when the start transmission moment for the second scheduled resource arrives, pause the transmission of the first scheduled resource, and after the transmission of the second scheduled resource is completed, continue to transmitting a remaining portion of the first scheduled resource.

In a possible embodiment of the present disclosure, the UE further includes a retransmission module configured to, when a retransmission moment arrives, retransmit the first scheduled resource in accordance with a retransmission scheduling command.

In a possible embodiment of the present disclosure, the determination unit is further configured to, when the to-be-transmitted service data packets merely have a same transmission time delay requirement and the transmission time delay for the scheduled resource indicated by the currently-received scheduling command is lower than the transmission time delay for the to-be-transmitted service data packets, map the to-be-transmitted service data packets to the uplink transmission resource, and transmit the to-be-transmitted service data packets on the uplink transmission resource.

It should be appreciated that, the UE corresponds to the above-mentioned method, so the implementation of the UE may refer to that of the method with a same technical effect.

Eighth Embodiment

Figure 17:
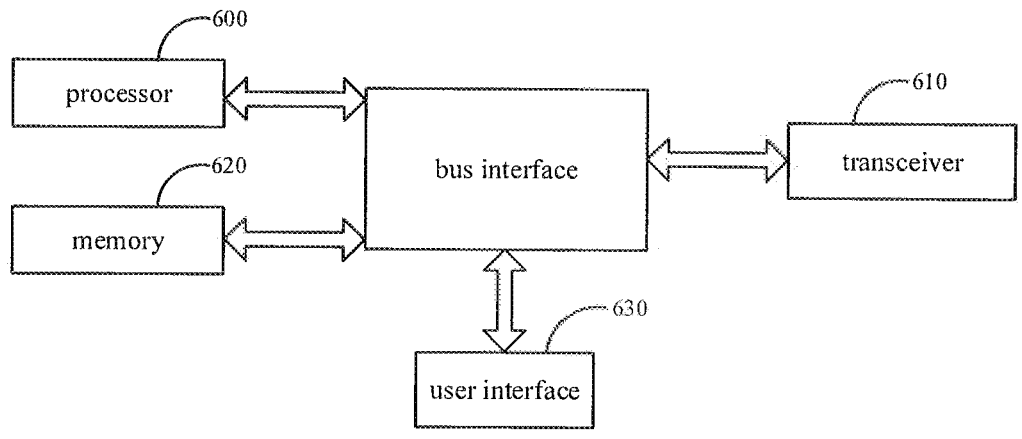
FIG. 17 is a schematic view showing a UE according to an eighth embodiment of the present disclosure.

As shown in FIG. 17, the present disclosure further provides in this embodiment a UE, including a processor 600, and a memory 620 connected to the processor 600 through a bus interface and configured to store therein programs and data for the operation of the processor. The processor 600 is configured to call and execute the programs and data stored in the memory 620, so as to: upon the receipt of a scheduling command for an uplink resource from a network side device, acquire attribute information of to-be-transmitted service data packets, the attribute information of the to-be-transmitted service data packets including a time delay; and map the to-be-transmitted service data packets to the uplink resource in accordance with a time delay requirement on the to-be-transmitted service data packets, and transmit the to-be-transmitted service data packets on the uplink resource.

In FIG. 17, bus architecture may include a number of buses and bridges connected to each other, so as to connect various circuits for one or more processors such as the processor 600 and one or more memories such as the memory 620. In addition, as is known in the art, the bus architecture may be used to connect any other circuits, such as a circuit for a peripheral device, a circuit for a voltage stabilizer and a power management circuit, which are not further defined herein. The bus interfaces may be provided, and a transceiver 610 may consist of a plurality of elements, i.e., a transmitter and a receiver for communication with any other devices over a transmission medium. With respect to different UEs, a user interface 630 may also be provided for devices which are to be arranged inside or outside the UE, and these devices may include but not limited to a keypad, a display, a speaker, a microphone and a joystick. The processor 600 may take charge of managing the bus architecture as well as general processings. The memory 620 may store therein data for the operation of the processor 600.

Ninth Embodiment

Figure 18:
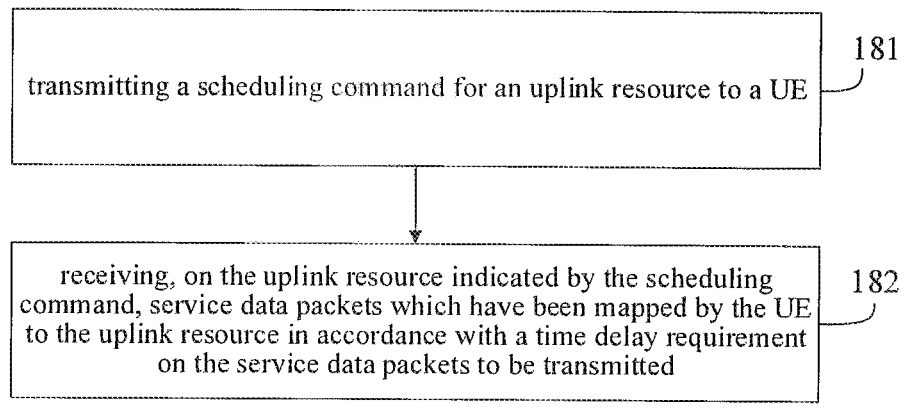
FIG. 18 is a flow chart of a service data packet transmission method at a network side device according to a ninth embodiment of the present disclosure.

As shown in FIG. 18, the present disclosure further provides in this embodiment a service data packet transmission method which includes: Step 181 of transmitting a scheduling command for an uplink resource to a UE; and Step 182 of receiving, on the uplink resource indicated by the scheduling command, service data packets which have been mapped by the UE to the uplink resource in accordance with a time delay requirement on the service data packets to be transmitted.

In a possible embodiment of the present disclosure, Step 182 includes, receiving, from a start transmission moment for a first scheduled resource indicated by a first scheduling command, a service data packet which has been mapped by the UE to the first scheduled resource in accordance with the time delay requirement on the service data packets to be transmitted, or receiving, from a start transmission moment for a second scheduled resource indicated by a second scheduling command, the service data packet which has been mapped by the UE to the first scheduled resource in accordance with the time delay requirement on the service data packets to be transmitted. The service data packets to be transmitted are mapped to the first scheduled resource or the second scheduled resource indicated by the subsequently-received second scheduling command in accordance with a determination result acquired after determining, by the UE, whether a first transmission time delay for the first scheduled resource indicated by the first scheduling command transmitted from a network side device meets the time delay requirement on the service data packets to be transmitted, and then transmitted. A second transmission time delay for the second scheduled resource is different from the first transmission time delay for the first scheduled resource.

Tenth Embodiment

The present disclosure further provides in this embodiment a network side device which includes: a transmission module configured to transmit a scheduling command for an uplink resource to a UE; and a reception module configured to receive, on the uplink resource indicated by the scheduling command, service data packets which have been mapped by the UE to the uplink resource in accordance with a time delay requirement on the service data packets to be transmitted.

In a possible embodiment of the present disclosure, the reception module is further configured to receive, from a start transmission moment for a first scheduled resource indicated by a first scheduling command, a service data packet which has been mapped by the UE to the first scheduled resource in accordance with the time delay requirement on the service data packets to be transmitted, or receive, from a start transmission moment for a second scheduled resource indicated by a second scheduling command, the service data packet which has been mapped by the UE to the first scheduled resource in accordance with the time delay requirement on the service data packets to be transmitted. The service data packets to be transmitted are mapped to the first scheduled resource or the second scheduled resource indicated by the subsequently-received second scheduling command in accordance with a determination result acquired after determining, by the UE, whether a transmission time delay for the first scheduled resource indicated by the first scheduling command transmitted from a network side device meets the time delay requirement on the service data packets to be transmitted, and then transmitted. A second transmission time delay for the second scheduled resource is different from the first transmission time delay for the first scheduled resource.

It should be appreciated that, the network side device may be a base station, and a device corresponding to the above-mentioned method of the network side device, so the implementation of the device may refer to that of the above-mentioned method with a same technical effect.

Eleventh Embodiment

The present disclosure further provides in this embodiment a network side device which includes a processor, a memory connected to the processor through a bus interface, and a transceiver connected to the processor through the bus interface. The memory is configured to store therein programs and data for the operation of the processor. The transceiver is configured to transmit data information or a pilot signal, and receive a downlink control channel. The processor is configured to call and execute the programs and data stored in the memory, so as to: transmit a scheduling command for an uplink resource to a UE; and receive, on the uplink resource indicated by the scheduling command, service data packets which have been mapped by the UE to the uplink resource in accordance with a time delay requirement on the service data packets to be transmitted.

The UE and the network side device in the above-mentioned embodiments may be adapted to, but not limited to a common scenario where there is a collision between a long TTI (including, but not limited to, the 1 ms TTI) and a short TTI. When there is the collision between the long TTI and the short TTI and the UE is incapable of transmitting the data through the resource scheduled twice, through the above-mentioned embodiments of the present disclosure, it is able to transmit the delay-sensitive service data preferentially.

A basic principle of the present disclosure has been described hereinbefore in conjunction with the embodiments. However, it should be appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Alternatively, some steps may also be performed in parallel, or independently of each other.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A service data packet transmission method, comprising:
    upon receipt of a scheduling command for an uplink resource transmitted from a network side device, acquiring attribute information of to-be-transmitted service data packets, the attribute information of the to-be-transmitted service data packets comprising a time delay; and
    mapping the to-be-transmitted service data packets to the uplink resource in accordance with a time delay requirement on the to-be-transmitted service data packets, and transmitting the to-be-transmitted service data packets on the uplink resource,
    wherein the mapping the to-be-transmitted service data packets to the uplink resource in accordance with the time delay requirement on the to-be-transmitted service data packets and transmitting the to-be-transmitted service data packets on the uplink resource comprises:

determining whether a first transmission time delay for a first scheduled resource indicated by a first scheduling command transmitted from the network side device meets the time delay requirement on the to-be-transmitted service data packets, to acquire a determination result; and mapping the to-be-transmitted service data packets to the first scheduled resource or a second scheduled resource indicated by a subsequently-received second scheduling command in accordance with the determination result, and transmitting the to-be-transmitted service data packets on the first scheduled resource or the second scheduled resource, wherein a second transmission time delay for the second scheduled resource is different from the first transmission time delay for the first scheduled resource, wherein the service data packet transmission method further comprises:

when the transmission time delay for the first scheduled resource does not meet a first time delay requirement on a first to-be-transmitted service data packet of the to-be-transmitted service data packets and the second scheduled resource indicated by the second scheduling command has not been received within a subsequent predetermined time period, transmitting the to-be-transmitted service data packets through initiating a scheduling request for the uplink resource, or transmitting the to-be-transmitted service data packets on a competition resource.

2. The service data packet transmission method according to claim 1, wherein the mapping the to-be-transmitted service data packets to the second scheduled resource indicated by the subsequently-received second scheduling command in accordance with the determination result comprises:

when the first transmission time delay for the first scheduled resource does not meet a first time delay requirement on a first to-be-transmitted service data packet of the to-be-transmitted service data packets and the second scheduled resource having a second transmission time delay indicated by the second scheduling command has been subsequently received from the network side device, mapping the first to-be-transmitted service data packet to the second scheduled resource.

3. A service data packet transmission method, comprising:

upon receipt of a scheduling command for an uplink resource transmitted from a network side device, acquiring attribute information of to-be-transmitted service data packets, the attribute information of the to-be-transmitted service data packets comprising a time delay; and mapping the to-be-transmitted service data packets to the uplink resource in accordance with a time delay requirement on the to-be-transmitted service data packets, and transmitting the to-be-transmitted service data packets on the uplink resource, wherein the mapping the to-be-transmitted service data packets to the uplink resource in accordance with the time delay requirement on the to-be-transmitted service data packets and transmitting the to-be-transmitted service data packets on the uplink resource comprises:

determining whether a first transmission time delay for a first scheduled resource indicated by a first scheduling command transmitted from the network side device meets the time delay requirement on the to-be-transmitted service data packets, to acquire a determination result; and mapping the to-be-transmitted service data packets to the first scheduled resource or a second scheduled resource indicated by a subsequently-received second scheduling command in accordance with the determination result, and transmitting the to-be-transmitted service data packets on the first scheduled resource or the second scheduled resource, wherein a second transmission time delay for the second scheduled resource is different from the first transmission time delay for the first scheduled resource;

the first transmission delay is greater than the second transmission delay, wherein the mapping the to-be-transmitted service data packets to the first scheduled resource in accordance with the determination result and transmitting the to-be-transmitted service data packets on the first scheduled resource comprises:

when the first transmission time delay for the first scheduled resource meets a first time delay requirement on a first to-be-transmitted service data packet of the to-be-transmitted service data packets, mapping the first to-be-transmitted service data packet to the first scheduled resource and transmitting the first to-be-transmitted service data packet within the first transmission delay; and when the first transmission time delay for the first scheduled resource does not meet the first time delay requirement on the first to-be-transmitted service data packet of the to-be-transmitted service data packets, mapping other to-be-transmitted service data packets of the to-be-transmitted service data packets other than the first to-be-transmitted service data packet to the first scheduled resource and transmitting the other to-be-transmitted service data packets within the first transmission delay, wherein the service data packet transmission method further comprises:

when the second scheduled resource indicated by the second scheduling command has been received, the to-be-transmitted service data packets comprise a second to-be-transmitted service data packet, and a time delay requirement on the second to-be-transmitted service data packet is lower than a time delay requirement on the first to-be-transmitted service data packet, terminating the transmission of the first scheduled resource, mapping the second to-be-transmitted service data packet to the second scheduled resource, and transmitting the second to-be-transmitted service data packet on the second scheduled resource; and when the to-be-transmitted service data packets do not comprise any other data packet where a time delay requirement on the any other data packet is lower than the time delay requirement on the first to-be-transmitted service data packet, omitting the second scheduling command.

4. The service data packet transmission method according to claim 3, wherein when the to-be-transmitted service data packets further comprise a second to-be-transmitted service data packet having a second time delay requirement and a length of the second time delay requirement is greater than a length of the first time delay requirement, mapping the first to-be-transmitted service data packet and at least a part of the second to-be-transmitted service data packet to the first scheduled resource, and transmitting the first to-be-transmitted service data packet and the at least a part of the second to-be-transmitted service data packet on the first scheduled resource within the first transmission time delay.

5. The service data packet transmission method according to claim 3, wherein the mapping the to-be-transmitted service data packets to the second scheduled resource indicated by the subsequently-received second scheduling command in accordance with the determination result comprises:
when the first transmission time delay for the first scheduled resource does not meet a first time delay requirement on a first to-be-transmitted service data packet of the to-be-transmitted service data packets and the second scheduled resource having a second transmission time delay indicated by the second scheduling command has been subsequently received from the network side device, mapping the first to-be-transmitted service data packet to the second scheduled resource.

6. The service data packet transmission method according to claim 3, wherein the terminating the transmission of the first scheduled resource comprises:
when it determines to terminate the transmission of the first scheduled resource and a start transmission moment for the first scheduled resource does not arrive, not transmitting the first scheduled resource; or
when a start transmission moment for the second scheduled resource arrives, terminating the transmission of the first scheduled resource; or
when the start transmission moment for the second scheduled resource arrives, pausing the transmission of the first scheduled resource, and after the transmission of the second scheduled resource is completed, continuing to transmitting a remaining portion of the first scheduled resource.

7. The service data packet transmission method according to claim 3, wherein subsequent to terminating the transmission of the first scheduled resource, the service data packet transmission method further comprises:
when a retransmission moment arrives, retransmitting the first scheduled resource in accordance with a retransmission scheduling command.

8. A service data packet transmission method, comprising:
upon receipt of a scheduling command for an uplink resource transmitted from a network side device, acquiring attribute information of to-be-transmitted service data packets, the attribute information of the to-be-transmitted service data packets comprising a time delay; and
mapping the to-be-transmitted service data packets to the uplink resource in accordance with a time delay requirement on the to-be-transmitted service data packets, and transmitting the to-be-transmitted service data packets on the uplink resource,
wherein the mapping the to-be-transmitted service data packets to the uplink resource in accordance with the time delay requirement on the to-be-transmitted service data packets and transmitting the to-be-transmitted service data packets on the uplink resource comprises:
determining the to-be-transmitted service data packets corresponding to a transmission time delay for a scheduled resource indicated by a currently-received scheduling command in accordance with a preconfigured correspondence between the time delay requirement on the to-be-transmitted service data packets and the scheduled resource; and
mapping the to-be-transmitted service data packets to the scheduled resource, and transmitting the to-be-transmitted service data packets on the scheduled resource, wherein the determining the to-be-transmitted service data packets corresponding to the transmission time delay for the scheduled resource indicated by the currently-received scheduling command comprises:
determining other to-be-transmitted service data packets of the to-be-transmitted service data packets other than a first to-be-transmitted service data packet as the to-be-transmitted service data packets corresponding to the transmission time delay for a first scheduled resource indicated by the currently-received scheduling command, wherein the time delay requirement on the first to-be-transmitted service data packet is lower than the time delay requirement on the other to-be-transmitted service data packets,
wherein subsequent to mapping the other to-be-transmitted service data packets to the first scheduled resource, the service data packet transmission method further comprises:
when a second scheduled resource indicated by a second scheduling command has not been received within a predetermined time period, transmitting the to-be-transmitted service data packets through initiating a scheduling request for the uplink resource or transmitting the first to-be-transmitted service data packet on a competition resource in accordance with the preconfigured correspondence between the correspondence between the time delay requirement on the to-be-transmitted service data packets and the first scheduled resource.

9. A User Equipment (UE), comprising:
a processor and a memory connected to the processor through a bus interface, wherein the memory is configured to store therein programs and data for operation of the processor, and the processor is configured to call and execute the programs and data stored in the memory to implement the service data packet transmission method according to claim 1.

10. The UE according to claim 9, wherein the processor is further configured to call and execute the programs and data stored in the memory to:
when the first transmission time delay for the first scheduled resource does not meet a first time delay requirement on a first to-be-transmitted service data packet of the to-be-transmitted service data packets and the second scheduled resource having a second transmission time delay indicated by the second scheduling command has been subsequently received from the network side device, map the first to-be-transmitted service data packet to the second scheduled resource.

11. A User Equipment (UE), comprising:
a processor and a memory connected to the processor through a bus interface, wherein the memory is configured to store therein programs and data for operation of the processor, and the processor is configured to call and execute the programs and data stored in the memory to implement the service data packet transmission method according to claim 3.

12. The service data packet transmission method according to claim 11, wherein the processor is further configured to call and execute the programs and data stored in the memory to:
when the to-be-transmitted service data packets further comprise a second to-be-transmitted service data packet having a second time delay requirement and a length of the second time delay requirement is greater than a length of the first time delay requirement, map the first to-be-transmitted service data packet and at least a part of the second to-be-transmitted service data packet to the first scheduled resource, and transmitting the first to-be-transmitted service data packet and the at least a part of the second to-be-transmitted service data packet on the first scheduled resource within the first transmission time delay.

13. The UE according to claim 11, wherein the processor is further configured to call and execute the programs and data stored in the memory to:
  when the first transmission time delay for the first scheduled resource does not meet a first time delay requirement on a first to-be-transmitted service data packet of the to-be-transmitted service data packets and the second scheduled resource having a second transmission time delay indicated by the second scheduling command has been subsequently received from the network side device, map the first to-be-transmitted service data packet to the second scheduled resource.

14. The UE according to claim 11, wherein the processor is further configured to call and execute the programs and data stored in the memory to:
  when it determines to terminate the transmission of the first scheduled resource and a start transmission moment for the first scheduled resource does not arrive, not transmit the first scheduled resource; or
  when a start transmission moment for the second scheduled resource arrives, terminate the transmission of the first scheduled resource; or
  when the start transmission moment for the second scheduled resource arrives, pause the transmission of the first scheduled resource, and after the transmission of the second scheduled resource is completed, continue to transmitting a remaining portion of the first scheduled resource.

15. The UE according to claim 11, wherein the processor is further configured to call and execute the programs and data stored in the memory to: subsequent to terminating the transmission of the first scheduled resource,
  when a retransmission moment arrives, retransmit the first scheduled resource in accordance with a retransmission scheduling command.

16. A User Equipment (UE), comprising:
  a processor and a memory connected to the processor through a bus interface, wherein the memory is configured to store therein programs and data for operation of the processor, and the processor is configured to call and execute the programs and data stored in the memory to implement the service data packet transmission method according to claim 8.

* * * * *